US010167027B2

(12) United States Patent
Perron et al.

(10) Patent No.: US 10,167,027 B2
(45) Date of Patent: Jan. 1, 2019

(54) MODULAR COUNTERWEIGHT

(71) Applicant: Oshkosh Corporation, Oshkosh, WI (US)

(72) Inventors: Jacob J. Perron, Chambersburg, PA (US); Bradley S. Kresge, Jefferson, MD (US)

(73) Assignee: Oshkosh Corporation, Oshkosh, WI (US)

( * ) Notice: Subject to any disclaimer, the term of this patent is extended or adjusted under 35 U.S.C. 154(b) by 96 days.

(21) Appl. No.: 15/354,986

(22) Filed: Nov. 17, 2016

(65) Prior Publication Data
US 2017/0137076 A1 May 18, 2017

Related U.S. Application Data

(60) Provisional application No. 62/257,168, filed on Nov. 18, 2015.

(51) Int. Cl.
*B62D 49/06* (2006.01)
*B62D 49/08* (2006.01)
*B62D 37/04* (2006.01)

(52) U.S. Cl.
CPC ......... *B62D 37/04* (2013.01); *B62D 49/0621* (2013.01)

(58) Field of Classification Search
CPC .............................. B62D 37/04; B62D 49/0621
USPC .................................................. 280/758, 759
See application file for complete search history.

(56) References Cited

U.S. PATENT DOCUMENTS

| 4,659,102 | A  | * | 4/1987  | Stuhrmann  | B62D 49/085 |
|           |    |   |         |            | 172/275     |
| 4,664,404 | A  | * | 5/1987  | Schultz    | B62D 49/085 |
|           |    |   |         |            | 172/611     |
| 5,131,802 | A  | * | 7/1992  | Sunami     | B66F 9/07554|
|           |    |   |         |            | 212/196     |
| 5,156,215 | A  | * | 10/1992 | Jensen     | B62D 49/085 |
|           |    |   |         |            | 172/250     |
| 5,462,309 | A  | * | 10/1995 | Jeffers    | E02F 9/18   |
|           |    |   |         |            | 187/222     |
| 5,833,268 | A  | * | 11/1998 | Aldrovandi | B60R 9/00   |
|           |    |   |         |            | 280/759     |
| 6,471,245 | B1 | * | 10/2002 | Schott     | B62D 49/085 |
|           |    |   |         |            | 280/759     |
| 6,988,560 | B2 | * | 1/2006  | Bay        | A01B 59/042 |
|           |    |   |         |            | 172/272     |
| 7,354,066 | B2 | * | 4/2008  | Yamamoto   | B62D 49/085 |
|           |    |   |         |            | 280/759     |
| 2002/0014506 | A1 | * | 2/2002 | Teich     | B60R 9/06   |
|           |    |   |         |            | 224/441     |
| 2009/0038186 | A1 | * | 2/2009 | Osswald   | B62D 21/14  |
|           |    |   |         |            | 37/413      |

(Continued)

Primary Examiner — Toan C To
(74) Attorney, Agent, or Firm — Foley & Lardner LLP

(57) ABSTRACT

A modular counterweight system includes a housing, a bracket, and an actuator. The housing is configured to selectively interface with a plurality of counterweights, facilitating incremental adjustment of an overall weight of the modular counterweight system. The bracket is configured to couple the housing to the vehicle, and the housing is at least one of (i) pivotally coupled to the bracket, (ii) extensionally coupled to the bracket, and (iii) translationally coupled to the bracket. The actuator is positioned to selectively reconfigure at least one of the housing and the bracket and thereby change the center of gravity of the modular counterweight system.

16 Claims, 22 Drawing Sheets

(56) References Cited

U.S. PATENT DOCUMENTS

2009/0043461 A1* 2/2009 Bordini ............... B62D 37/04
701/50

* cited by examiner

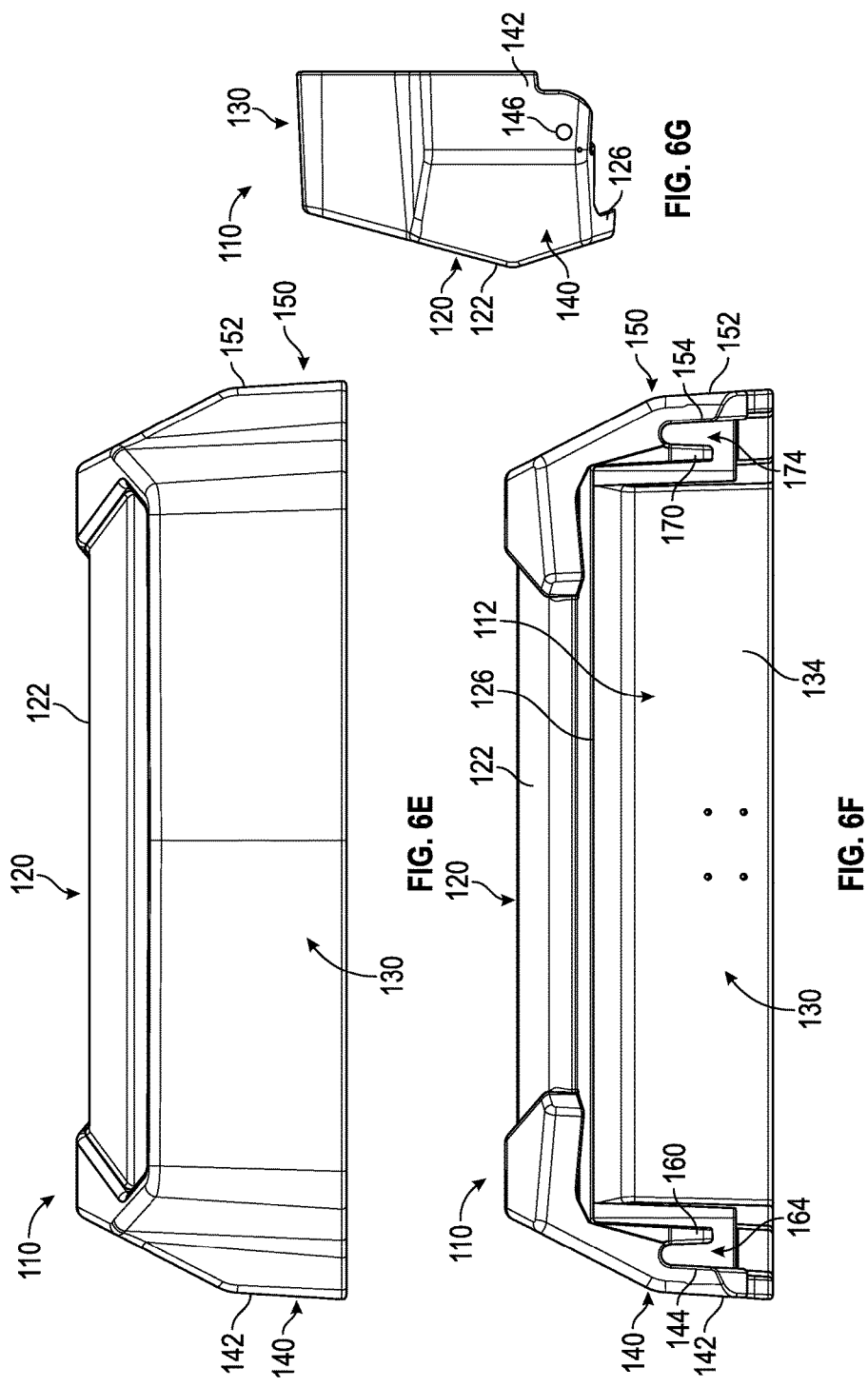

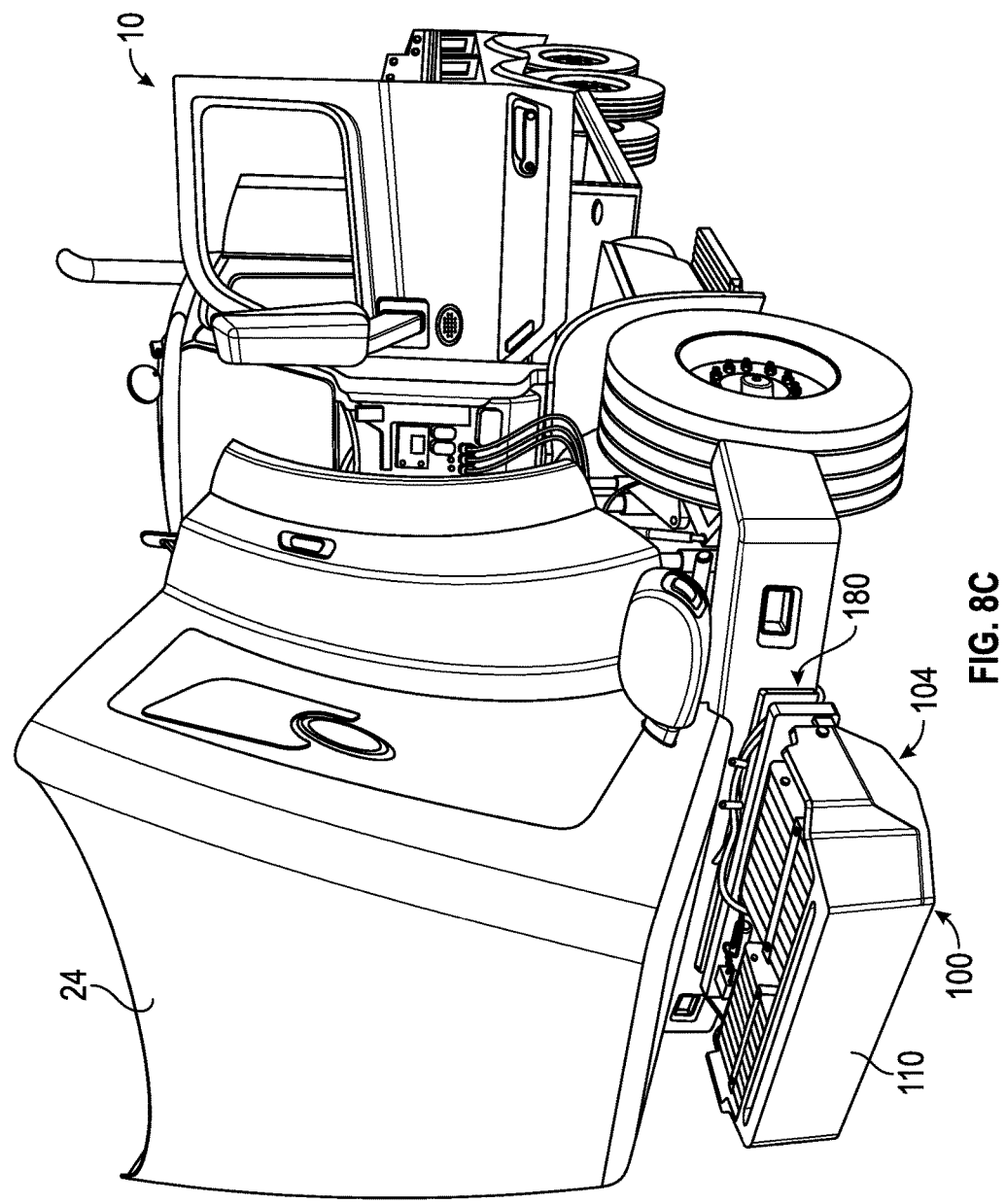

US 10,167,027 B2

MODULAR COUNTERWEIGHT

CROSS-REFERENCE TO RELATED PATENT APPLICATIONS

This application claims the benefit of U.S. Provisional Patent Application No. 62/257,168, filed Nov. 18, 2015, which is incorporated herein by reference in its entirety.

BACKGROUND

Counterweights are designed to allow a vehicle (e.g., a tow truck, etc.) to pick and/or tow heavy loads. Often, counterweights substantially increase the overall weight of a vehicle, increasing costs, decreasing maneuverability, and reducing storage space.

SUMMARY

One exemplary embodiment relates to a modular counterweight system for a vehicle. The modular counterweight system includes a housing, a bracket, and an actuator. The housing is configured to selectively interface with a plurality of counterweights, facilitating incremental adjustment of an overall weight of the modular counterweight system. The bracket is configured to couple the housing to the vehicle, and the housing is at least one of (i) pivotally coupled to the bracket, (ii) extensionally coupled to the bracket, and (iii) translationally coupled to the bracket. The actuator is positioned to selectively reconfigure at least one of the housing and the bracket and thereby change the center of gravity of the modular counterweight system.

Another exemplary embodiment relates to a vehicle. The vehicle includes a chassis defining a longitudinal axis, a body coupled to the chassis, and a modular counterweight system coupled to at least one of the chassis and the body. The modular counterweight system includes a plurality of counterweights, facilitating incremental adjustment of an overall weight of the modular counterweight system. The modular counterweight system is selectively repositionable relative to the at least one of the body and the chassis between a first position and a second position to provide a target center of gravity for the vehicle.

Still another exemplary embodiment relates to a modular counterweight system for a vehicle. The modular counterweight system includes a housing defining a cavity, a plurality of counterweights selectively received within the cavity, a bracket, and an actuator. The plurality of counterweights are configured to facilitate incrementally adjusting an overall weight of the modular counterweight system. The bracket is configured to couple the housing to at least one of a front end and a rear end of the vehicle. The actuator is positioned to facilitate selectively repositioning at least one of (i) the housing and the plurality of counterweights and (ii) the bracket from a base position to at least one of a rotated position and an extended position to provide a target center of gravity for the vehicle The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 6A-6H are various views of a housing of a modular counterweight system, according to an exemplary embodiment;

FIGS. 8A-8C are various views of a vehicle including a modular counterweight system in a second position, according to an exemplary embodiment;

DETAILED DESCRIPTION

Figure 1:
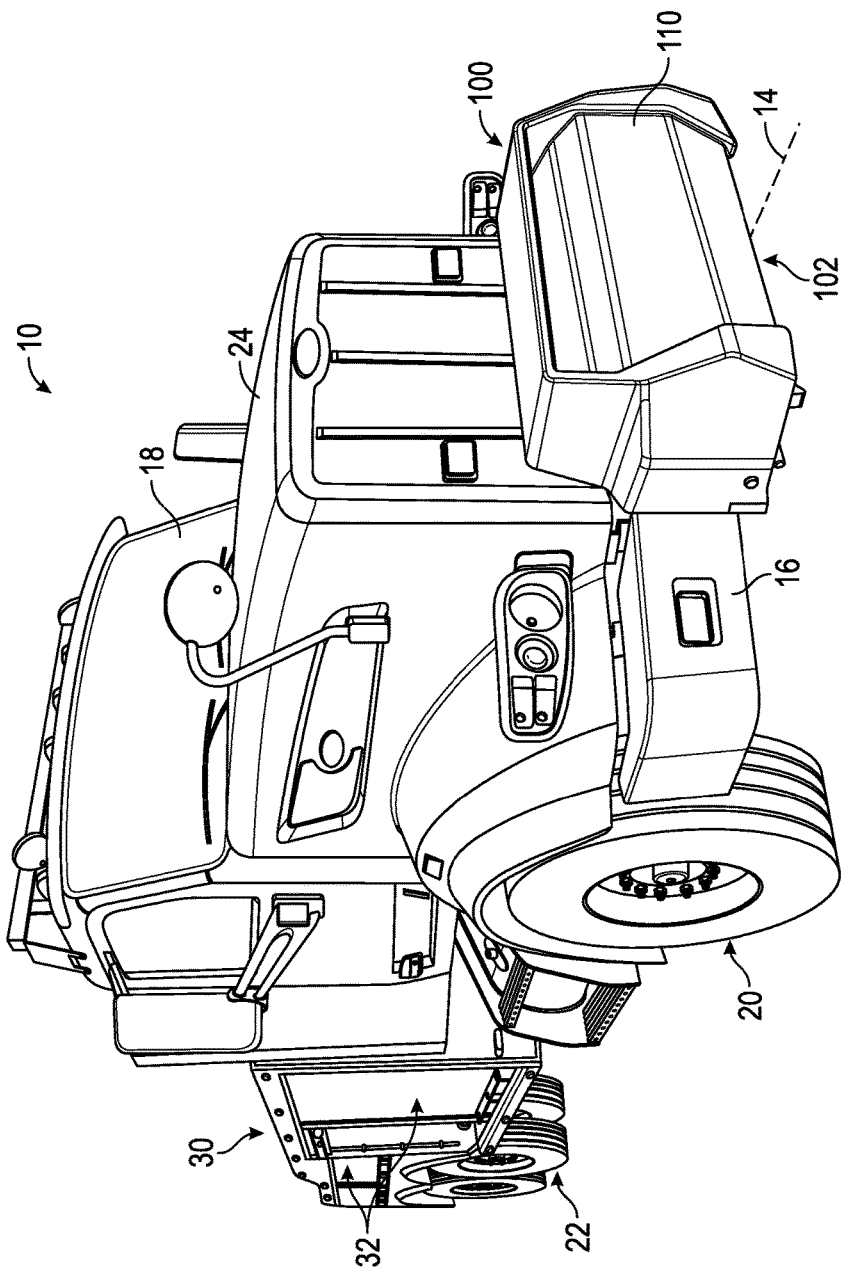
FIG. 1 is a front, right perspective view of a vehicle including a modular counterweight system in a first position, according to an exemplary embodiment.
Figure 2:
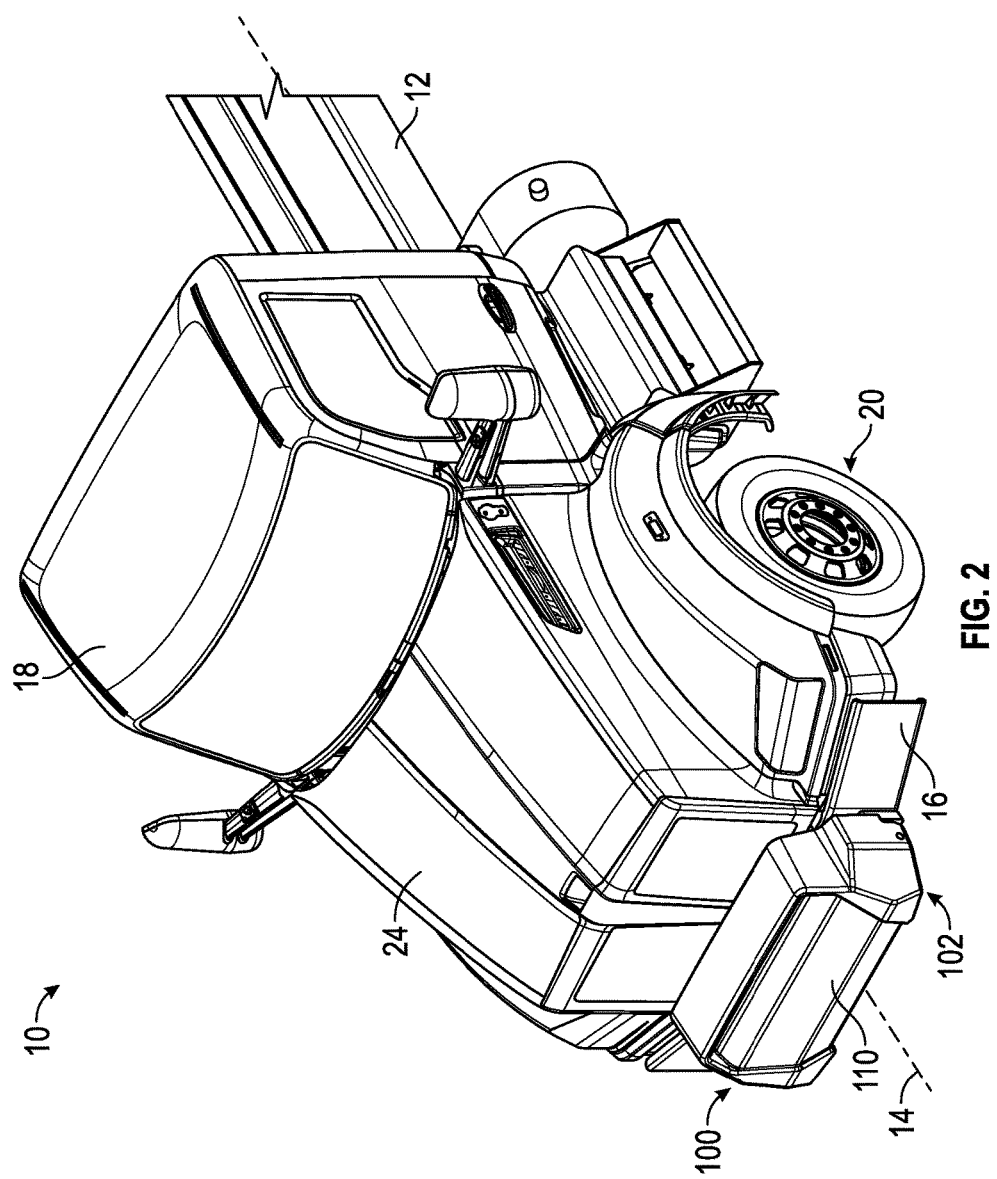
FIG. 2 is a front, left perspective view of a vehicle including a modular counterweight system in a first position, according to an exemplary embodiment.
Figure 3A:
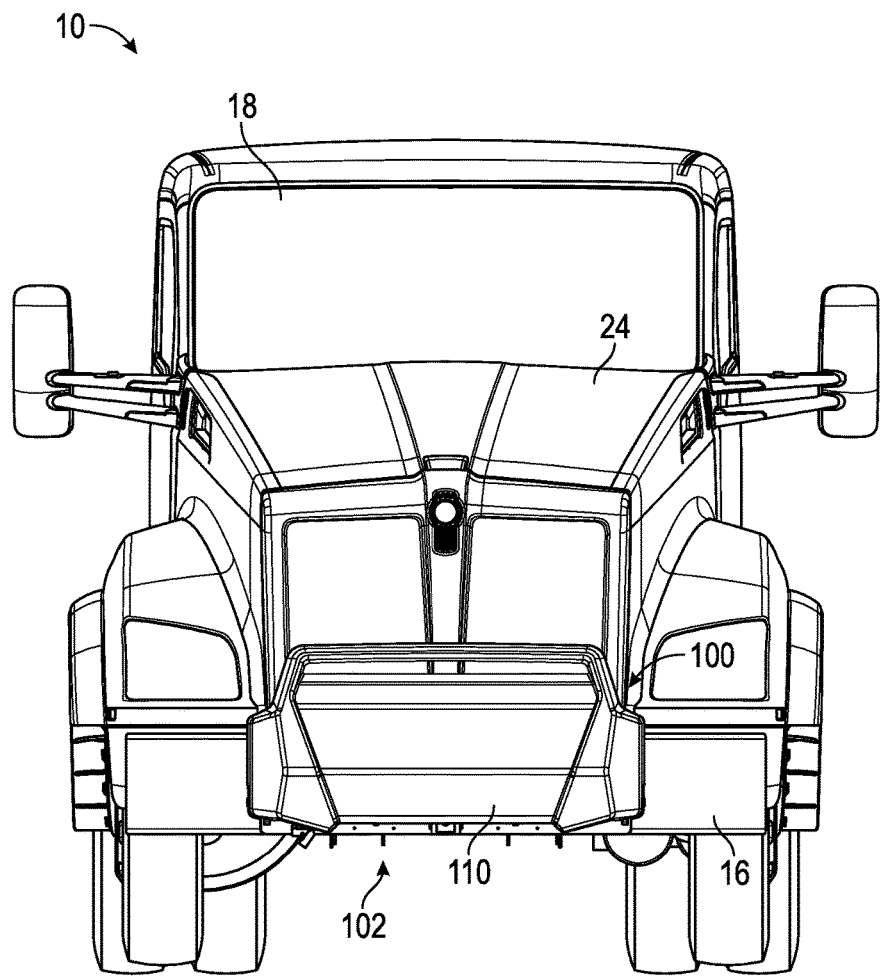
FIGS. 3A-3B are front views of a vehicle including a modular counterweight system in a first position, according to an exemplary embodiment.
Figure 3B:
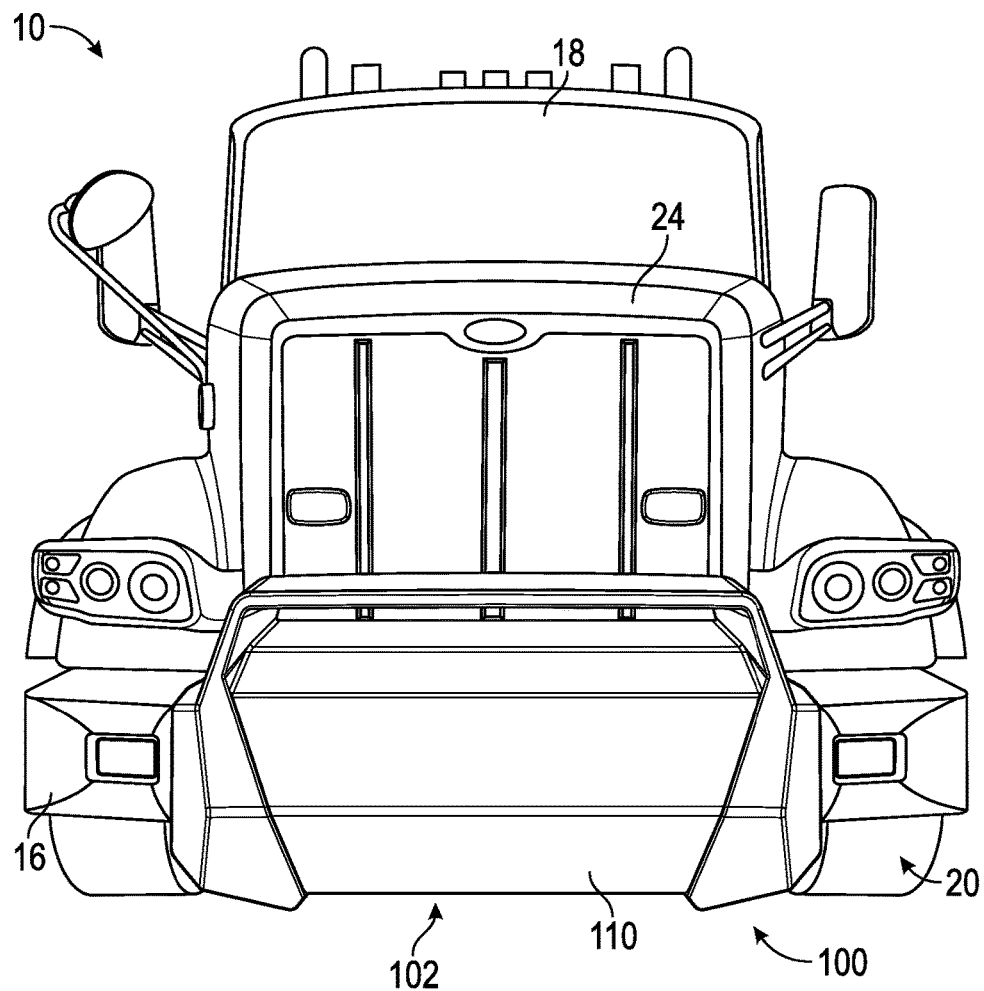

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a modular counterweight system is coupled to a vehicle (e.g., a frame, a body, a front bumper, etc.). The modular counterweight system may be configured to increase the effective weight provided to a front axle of the vehicle to increase performance (e.g., increase and/or maintain ground-bearing pressure between the steered tires of the front axle and the ground surface during a towing event, etc.). Traditional counterweight systems may include a counterweight fixed in a set orientation. Setting the counterweight is a fixed orientation may require the counterweight to be positioned below the front bumper of the vehicle to facilitate opening the hood of the vehicle (e.g., affecting serviceability, decreasing ground clearance, degrading approach angle, etc.). Other traditional counterweight systems may include a body counterweight. Body counterweights often substantially increase the overall weight of the vehicle (e.g., decreasing maneuverability, etc.) and decrease body storage of the vehicle. According to an exemplary embodiment, the modular counterweight system is selectively repositionable (e.g., modular, adjustable, adaptable, pivotable, extendable, translatable, etc. relative to the front bumper of the vehicle, etc.). In one embodiment, the modular counterweight system is configured to be selectively pivotable relative to a mounting bracket coupling the modular counterweight to the vehicle. In another embodiment, the modular counterweight system is configured to be selectively extendable (e.g., along a longitudinal axis of the vehicle, etc.). In some embodiments, the modular counterweight system is configured to be at least one of (e.g., both, etc.) selectively pivotable and selectively extendable. In an alternative embodiment, the modular counterweight system is configured to be selectively repositioned (e.g., translated, etc.) in a lateral direction (e.g., along the front bumper, etc.). According to an exemplary embodiment, selectively repositioning the modular counterweight system provides a target center of gravity for the vehicle, increasing performance (e.g., maneuverability, bearing pressure of the front axle, etc.). In some embodiments, the total weight of the modular counterweight system is able to be selectively increased or decreased (e.g., with removable weights, at predefined increments, etc.).

According to an exemplary embodiment, the modular counterweight system reduces the overall weight of a vehicle by reducing body weight and/or eliminating body counterweight systems, thereby effectively increasing the body storage of the vehicle, increasing the maneuverability of the vehicle (e.g., due to a lower weight vehicle, etc.), decreasing costs of manufacturability and ownership (e.g., more fuel efficient, a lower sales price, etc.), and/or satisfying various regulatory weight requirements. The modular counterweight system may also increase performance of the vehicle by increasing traction for maneuverability and/or increasing the towing capacity of the vehicle. The modular counterweight system may also improve the serviceability and/or ground clearance of a vehicle that has the modular counterweight system installed. In one embodiment, the serviceability is improved at least because the modular counterweight system is configured to pivot downward and/or extend away from the front bumper. Such a swinging and/or extending capability facilitates opening the hood and accessing the engine compartment without needing to remove the modular counterweight system for service or having to mount the modular counterweight system lower during installation of the modular counterweight system (e.g., thereby increasing ground clearance, etc.).

According to the exemplary embodiment shown in FIGS. 1-7E, a modular counterweight system, shown as counterweight system 100, is coupled to a vehicle, shown as truck 10. According to an exemplary embodiment, the truck 10 is a tow truck (e.g., a rotary tow truck, a wrecker truck, a carrier truck, etc.). By way of example, the counterweight system 100 may be mounted to Class 8 trucks manufactured by various companies. In other embodiments, the truck 10 is an aerial truck, a rescue truck, a concrete mixer truck, a commercial truck, a tanker, an ambulance, a military vehicle, or still another vehicle. As shown in FIGS. 1-4, the truck 10 includes a chassis, shown as frame 12, defining a longitudinal axis 14. The frame 12 supports a body assembly, shown as body assembly 30, including a number of compartments, shown as storage compartments 32, a number axles with wheel and tire assemblies, shown as front axle 20 and rear axles 22, a cab, shown as front cabin 18, and a bumper, shown as front bumper 16. The longitudinal axis 14 may be generally aligned with a frame rail of the truck 10 (e.g., front-to-back, etc.).

According to an exemplary embodiment, the truck 10 includes an engine that is coupled to the frame 12 and positioned underneath a hood, shown as hood 24. The engine may receive fuel (e.g., gasoline, diesel, etc.) from a fuel tank and combust the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the truck 10. According to an exemplary embodiment, the engine is a compression-ignition internal combustion engine that utilizes diesel fuel. In alternative embodiments, the engine is another type of device (e.g., spark-ignition engine, fuel cell, electric motor, etc.) that is otherwise powered (e.g., with gasoline, compressed natural gas, hydrogen, electricity, etc.).

Figure 4:
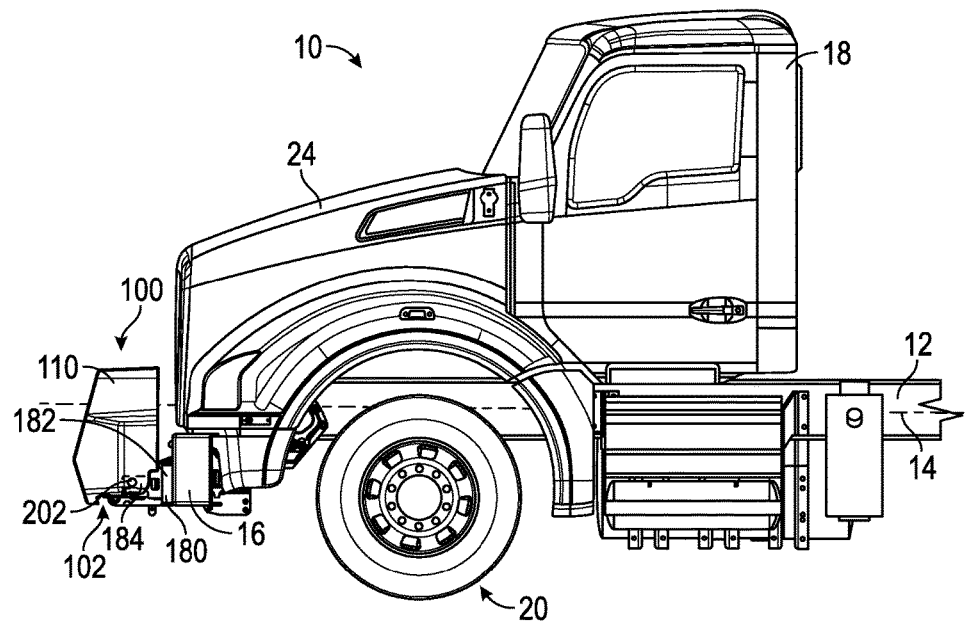
FIG. 4 is a left side view of a vehicle including a modular counterweight system in a first position, according to an exemplary embodiment.
Figure 5A:
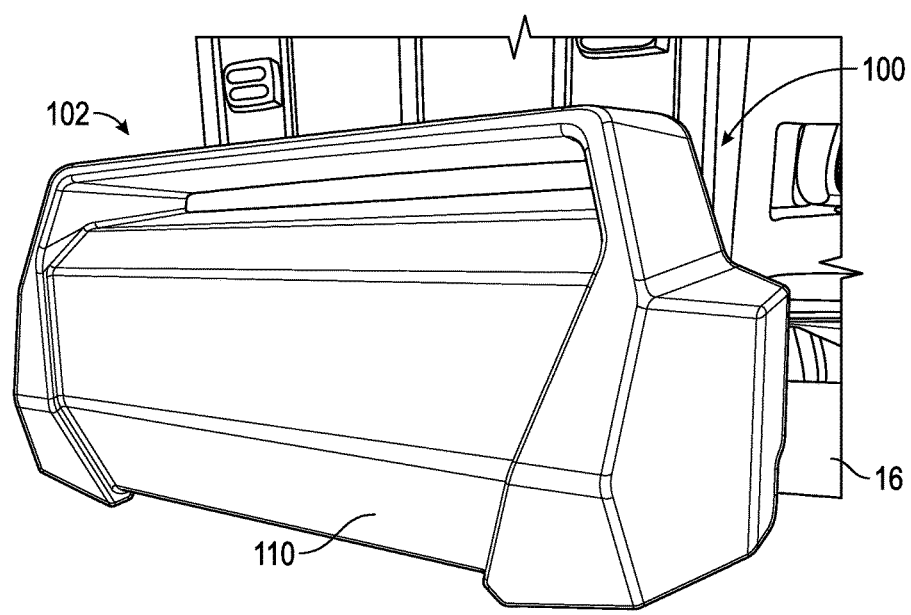
FIGS. 5A-5C are various views of a modular counterweight system coupled to a vehicle, according to an exemplary embodiment.
Figure 5B:
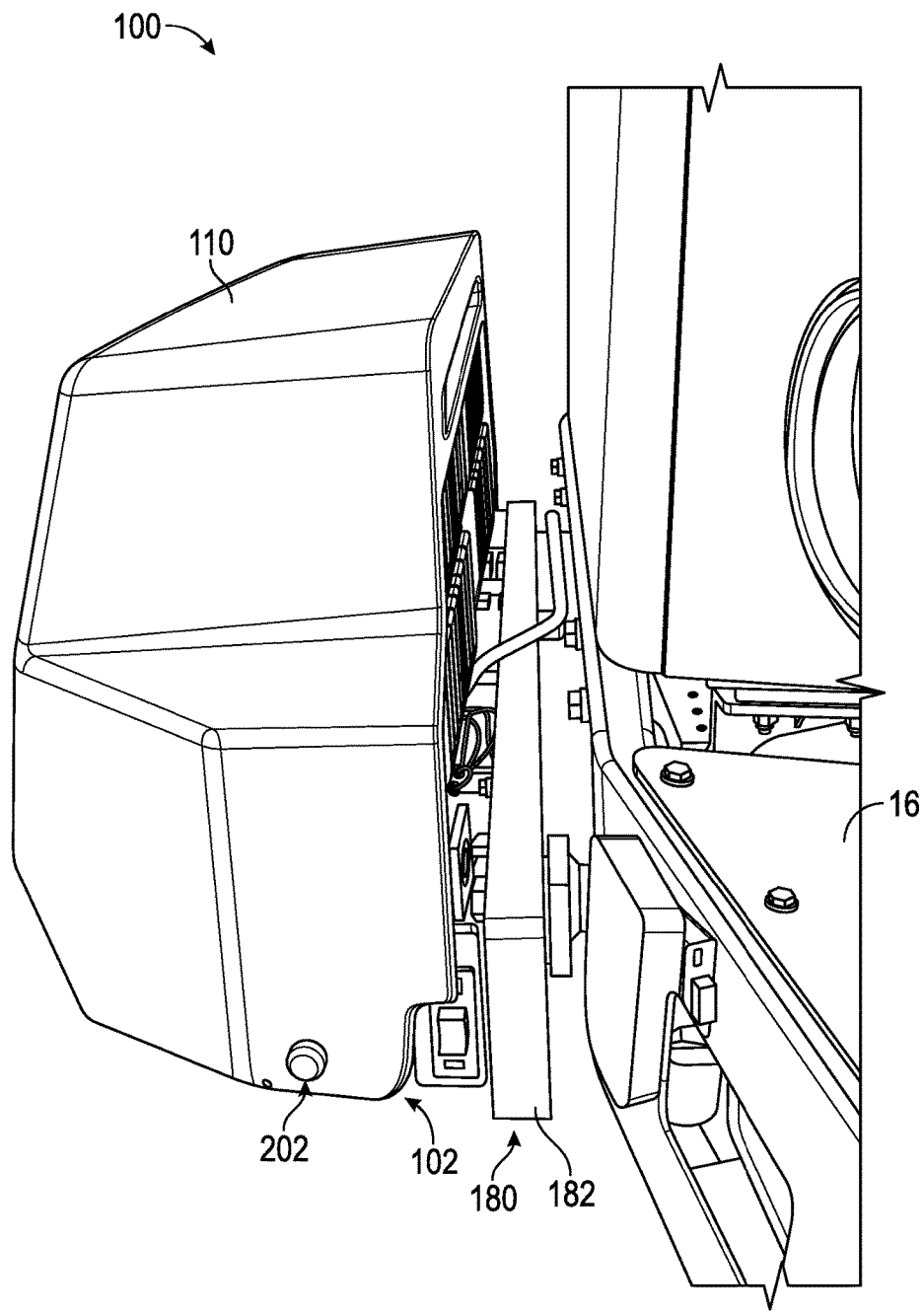
Figure 5C:
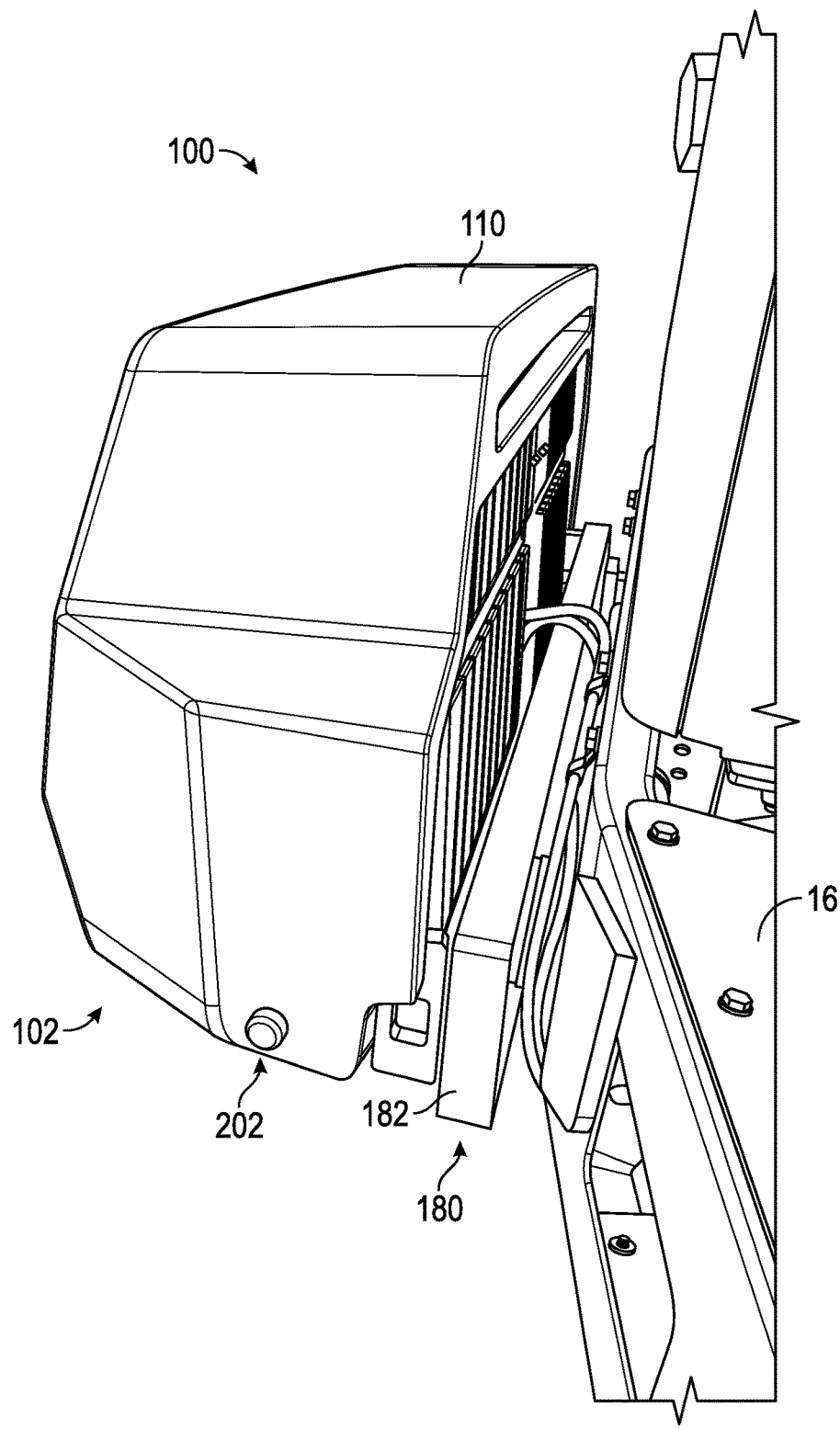

As shown in FIGS. 1-5C, the counterweight system 100 is coupled (e.g., fastened, attached, bolted, welded, etc.) to the front bumper 16 of the truck 10, centered about the longitudinal axis 14, and oriented in a first position, shown as base position 102. In some embodiments, the counterweight system 100 is directly coupled to the frame 12. In alternative embodiments, the counterweight system 100 is otherwise positioned (e.g., on a lateral side of the truck 10, on a rear of the truck 10, etc.). As shown in FIGS. 1-5C, the counterweight system 100 includes a housing, shown as counterweight housing 110, and a bracket, shown as mounting bracket 180. In other embodiments, the counterweight housing 110 directly engages the bumper 16 and/or the frame 12. As shown in FIGS. 4-5C, the mounting bracket 180 is configured to couple other components of the counterweight system 100 to the truck 10 (e.g., the front bumper 16, etc.). The mounting bracket 180 includes a plate, shown as mounting plate 182, and a pair of extensions, shown as arms 184. As shown in FIGS. 4 and 5B-5C, the mounting plate 182 is configured to be coupled (e.g., fastened, bottled, welded, attached, etc.) to a mounting location (e.g., the front bumper 16, etc.) of the truck 10.

According to an exemplary embodiment, one arm 184 is positioned on each lateral side of the mounting plate 182 and extends therefrom. In some embodiments, the mounting bracket 180 includes one or more additional arms 184 positioned along the mounting plate 182 (e.g., a centrally-positioned arm 184, etc.). According to an exemplary embodiment, the counterweight housing 110 is configured to engage the arms 184 of the mounting bracket 180, thereby coupling the counterweight housing 110 to the truck 10. In some embodiments, the counterweight housing 110 is selectively pivotable about one or more pins, shown as coupling pins 202, such that the counterweight housing 110 rotates (e.g., the top thereof, etc.) down and away from the mounting plate 182 of the mounting bracket 180 and/or the front bumper 16 (e.g., from the base position 102 to a second, rotated position, etc.). In some embodiments, the counterweight system 100 (e.g., the counterweight housing 110, the mounting bracket 180, etc.) is additionally or alternatively selectively extendable away from the truck 10 and/or front bumper 16 (e.g., from the base position 102 to a third, extended position, etc.).

As shown in FIGS. 6A-6H, the counterweight housing 110 includes a first plate, shown as front plate 120, a second plate, shown as top plate 130, a third plate, shown as left plate 140, a fourth plate opposite the third plate, shown as right plate 150, a first interface, shown as left bracket 160, a second interface, shown as right bracket 170, a first mount, shown as left mount 168, a second mount, shown as right mount 178, and a third mount, shown as central mount 136. As shown in FIGS. 6B, 6D, 6F, and 6H, the front plate 120, the top plate 130, the left plate 140, and the right plate 150 define an internal cavity of the counterweight housing 110, shown as cavity 112. According to an exemplary embodiment, the front plate 120, the top plate 130, the left plate 140, the right plate 150, the left bracket 160, the right bracket 170, the left mount 168, the right mount 178, and/or the central mount 136 from a single, unitary (e.g., continuous, integral, etc.) structure of the counterweight housing 110 (e.g., manufactured using a casting process, etc.). In an alternative embodiment, one or more of the portions of the counterweight housing 110 are coupled (e.g., welded, fastened, bolted, etc.) to each other to form the counterweight housing 110. In still other embodiments, the counterweight housing 110 includes more or fewer walls, plates, brackets, or still other portions.

Figure 6A:
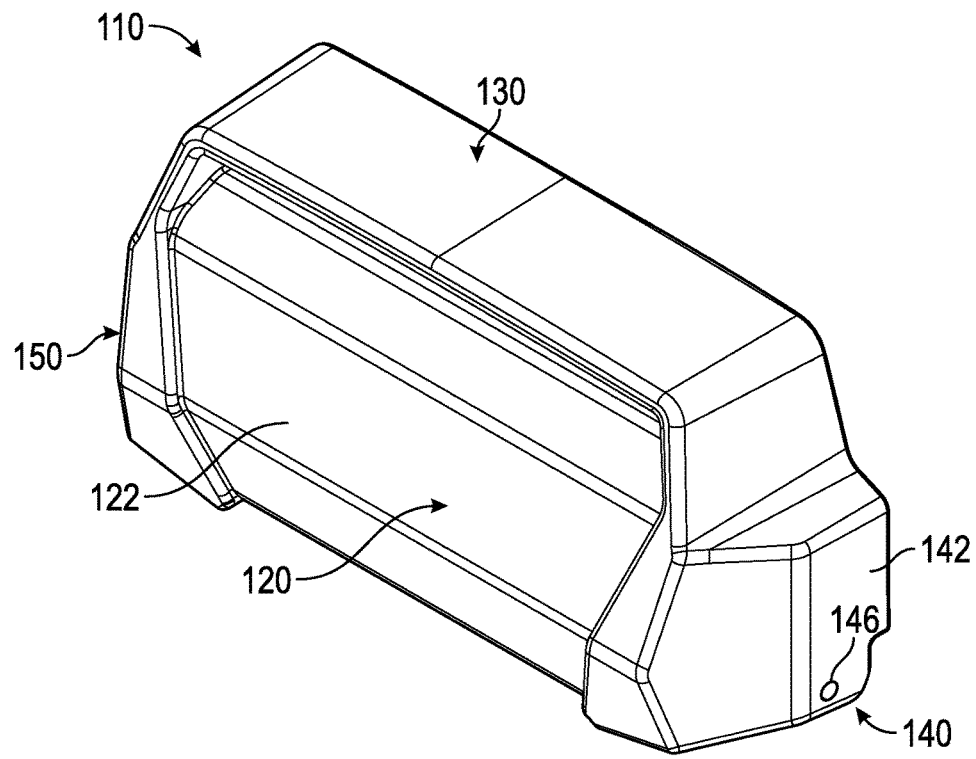
Figure 6B:
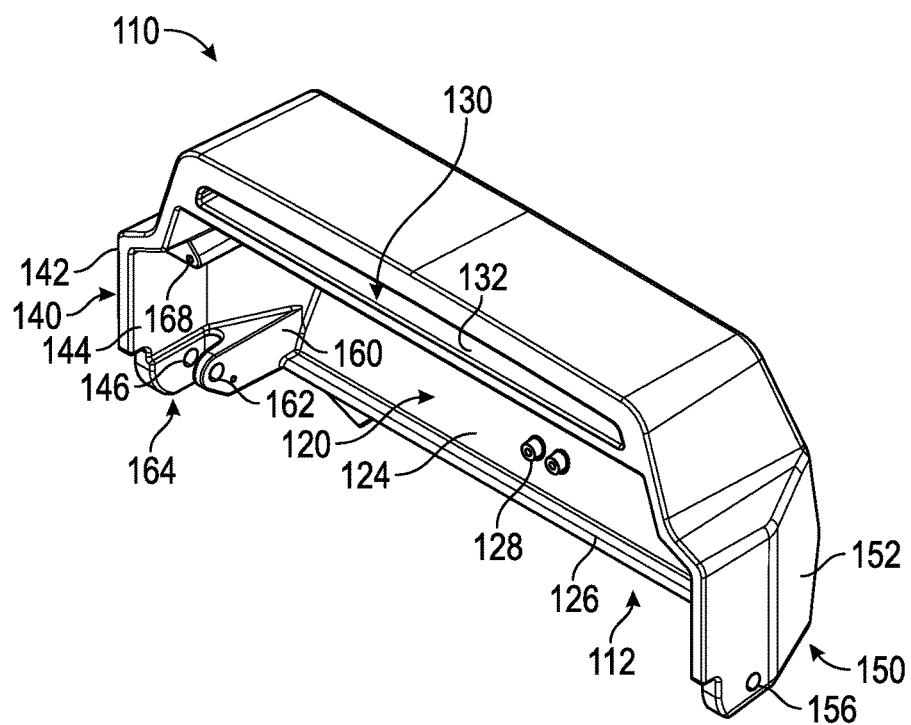
Figure 6C:
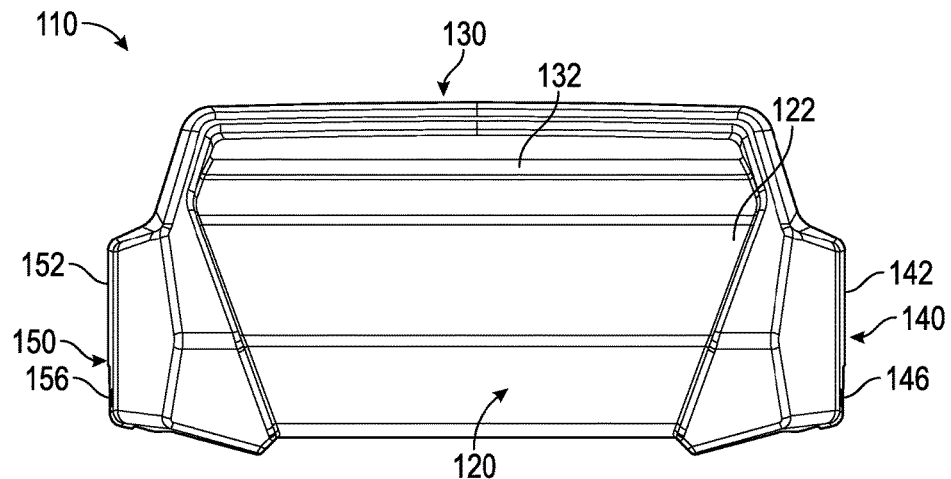
Figure 6D:
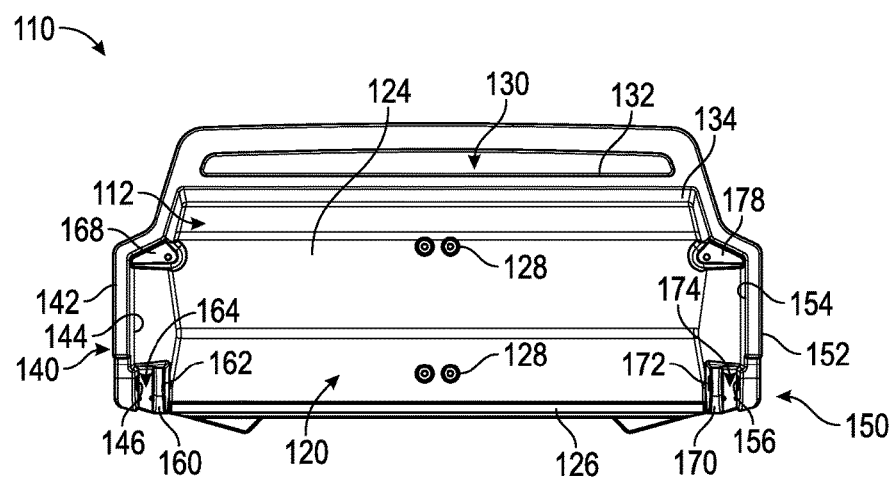
Figure 6H:
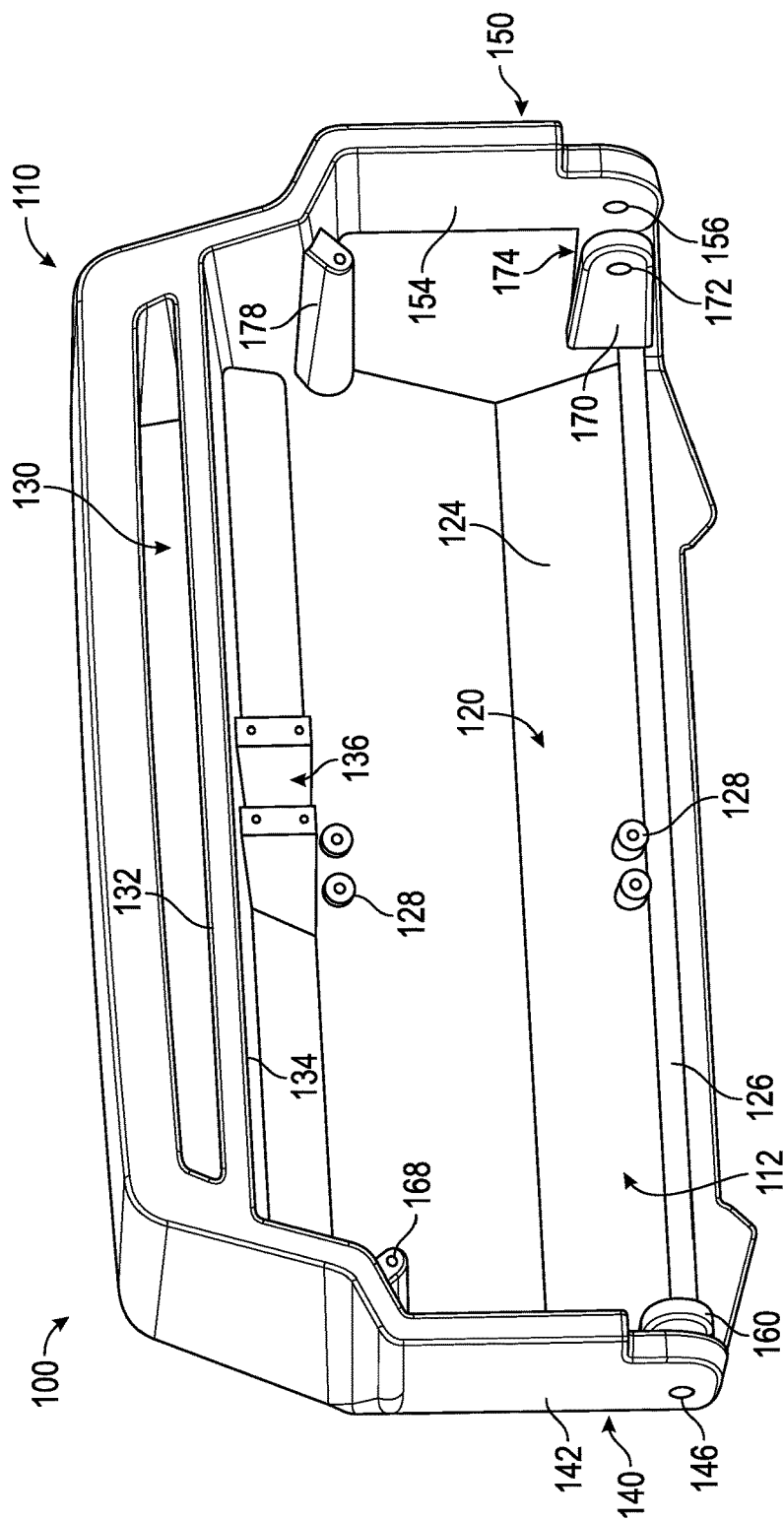

As shown in FIGS. 6A-6H, the front plate 120 has a first side, shown as outer wall 122, facing away from the cavity 112 and an opposing second side, shown as inner wall 124, that defines a portion of the cavity 112. As shown in FIGS. 6B, 6D, and 6F-6H, the front plate 120 defines a lip, shown as retaining lip 126, positioned towards the bottom of the front plate 120 and extending between the left bracket 160 and the right bracket 170. As shown in FIGS. 6B, 6D, and 6H, the inner wall 124 of the front plate 120 includes a plurality of mounts, shown as central mounts 128, positioned about a central, vertical axis or plane of the counterweight housing 110. As shown in FIGS. 6B-6D, 6F, and 6H, the top plate 130 has a first side, shown as outer wall 132, facing away from the cavity 112 and an opposing second side, shown as inner wall 134, that defines a portion of the cavity 112. As shown in FIG. 6H, the central mount 136 is positioned about a central, vertical axis or plane of the counterweight housing 110 and extends from the inner wall 124 of the front plate 120 and the inner wall 134 of the top plate 130.

As shown in FIGS. 6A-6H, the left plate 140 has a first side, shown as outer wall 142, facing away from the cavity 112 and an opposing second side, shown as inner wall 144, that defines as portion of the cavity 112. As shown in FIGS. 6A-6D and 6G-6H, the left plate 140 defines an aperture, shown as through hole 146. As shown in FIGS. 6B, 6D, and 6F, the left bracket 160 is spaced from the inner wall 144 of the left plate 140, defining a gap, shown as gap 164. As shown in FIGS. 6B and 6D, the left bracket 160 defines an aperture, shown as through hole 162, positioned to correspond in location with the through hole 146 of the left plate 140.

As shown in FIGS. 6B-6F and 6H, the right plate 150 has a first side, shown as outer wall 152, facing away from the cavity 112 and an opposing second side, shown as inner wall 154, that defines a portion of the cavity 112. As shown in FIGS. 6B-6D and 6G-6H, the right plate 150 defines an aperture, shown as through hole 156. As shown in FIGS. 6D, 6F, and 6H, the right bracket 170 is spaced from the inner wall 154 of the right plate 150, defining a gap, shown as gap 174. As shown in FIGS. 6D and 6H, the right bracket 170 defines an aperture, shown as through hole 172, positioned to correspond in location with the through hole 156 of the right plate 150.

According to an exemplary embodiment, the gap 164 defined between the left plate 140 and the left bracket 160 is configured to receive a first arm 184 (e.g., a left arm, etc.) extending from the left lateral side of the mounting plate 182 of the mounting bracket 180. The first arm 184 of the mounting bracket 180 defines an aperture (e.g., through hole, etc.) that cooperates with (e.g., in location, in size, etc.) the through hole 146 of the left plate 140 and the through hole 162 of the left bracket 160, according to an exemplary embodiment. According to an exemplary embodiment, the gap 174 defined between the right plate 150 and the right bracket 170 is configured to receive a second arm 184 (e.g., a right arm, etc.) extending from the right lateral side of the mounting plate 182 of the mounting bracket 180. The second arm 184 of the mounting bracket 180 defines an aperture (e.g., through hole, etc.) that cooperates with (e.g., in location, in size, etc.) the through hole 156 of the right plate 150 and the through hole 172 of the right bracket 170, according to an exemplary embodiment. Thus, the coupling pins 202 may be received by the through hole 146 of the left plate 140, the through hole of the left arm 184, the through hole 162 of the left bracket 160, the through hole 172 of the right bracket 170, the through hole of the right arm 184, and the through hole 156 of the right plate 150, thereby pivotally (e.g., rotationally, hingedly, etc.) coupling the counterweight housing 110 to the mounting bracket 180. In an alternative embodiment, the counterweight housing 110 and the mounting bracket 180 are coupled together in a fixed arrangement (e.g., a unitary structure, welded, fastened such that the counterweight housing 110 does not pivot relative to the mounting bracket 180, etc.).

Figure 7A:
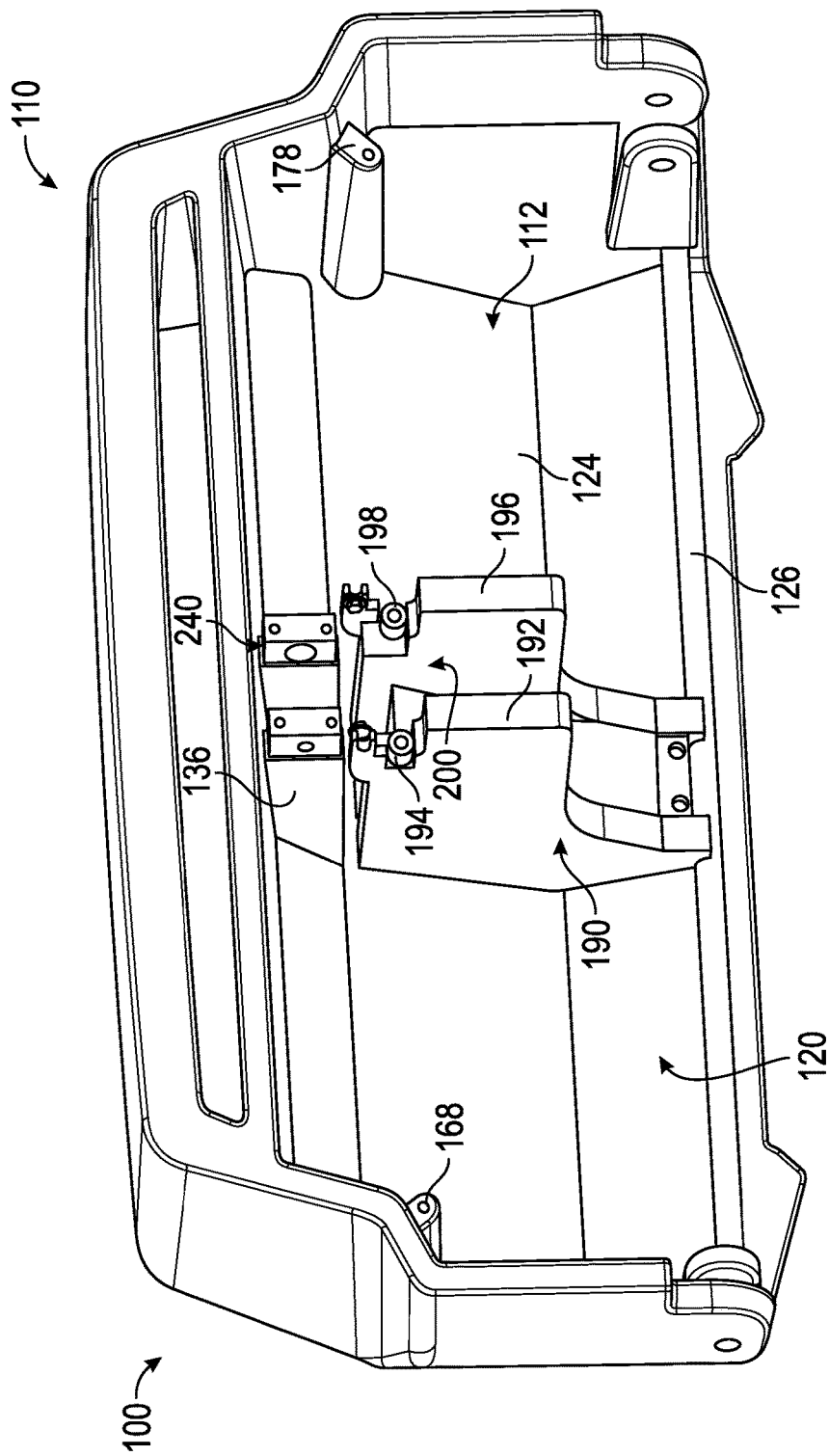
FIGS. 7A-7E are various views of a modular counterweight system, according to an exemplary embodiment.
Figure 7B:
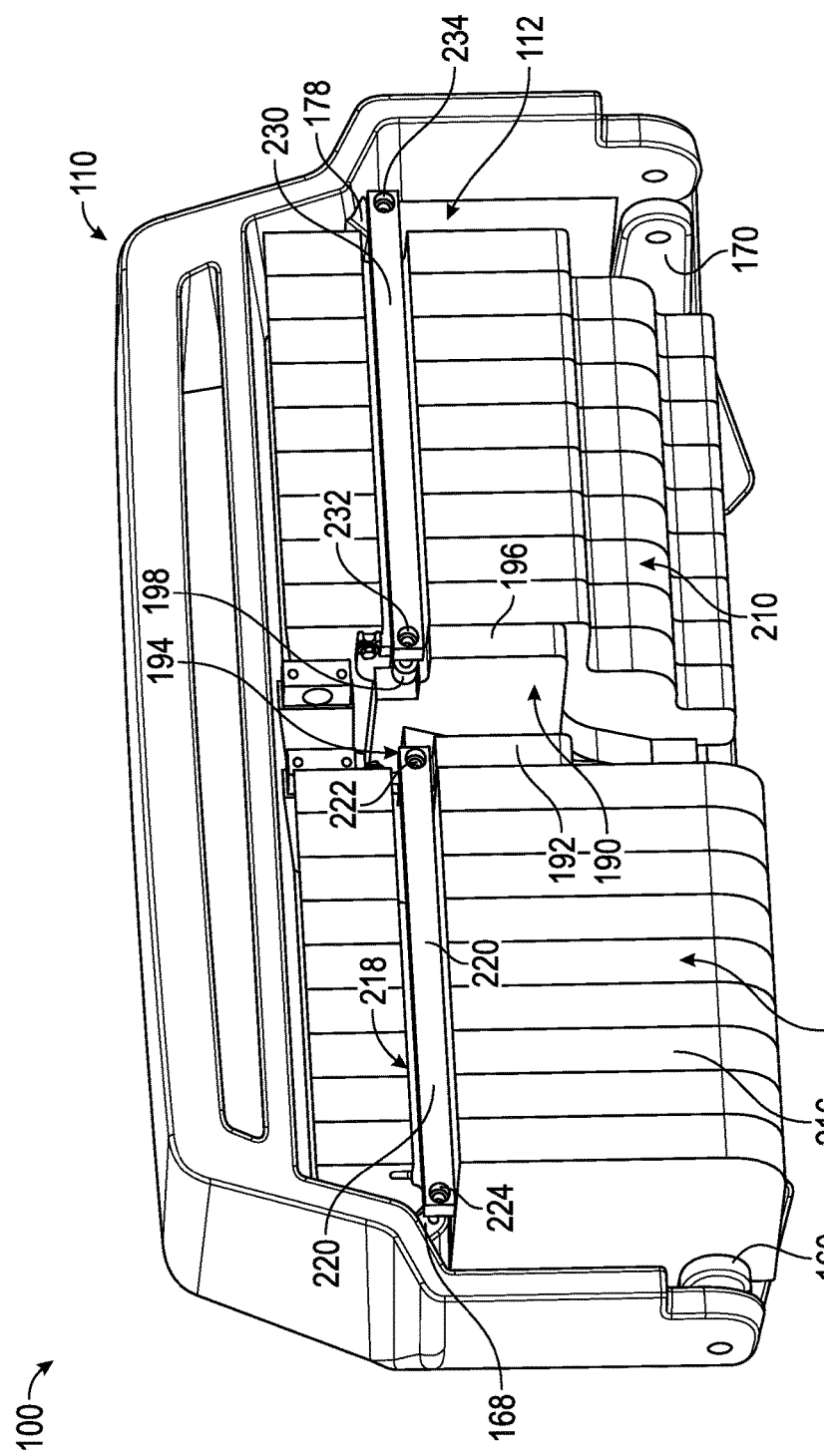

As shown in FIGS. 7A-7E, the counterweight housing 110 is configured to receive and store a plurality of other components of the counterweight system 100. As shown in FIG. 7A, the central mount 136 is configured to facilitate coupling a bracket, shown as actuator bracket 240, to the counterweight housing 110 (e.g., with fasteners, welded, integrally coupled or formed, etc.). The central mounts 128 positioned along the inner wall 124 of the front plate 120 are configured to facilitate coupling a bracket, shown as center bracket 190, to the counterweight housing 110. In an alternative embodiment, the center bracket 190 is integrally formed with the counterweight housing 110. As shown in FIG. 7A, the center bracket 190 is shaped to correspond with the shape of the inner wall 124 and the retaining lip 126 of the front plate 120 and extend therefrom. As shown in FIGS. 7A-7B, the center bracket 190 includes a first plate, shown as left plate 192, and a second plate, shown as right plate 196, spaced from one another and defining a cavity, shown as actuator cavity 200, therebetween. The left plate 192 defines a first mount, shown as central mount 194, and the right plate 196 defines a second mount, shown as central mount 198. According to an exemplary embodiment, the left plate 192 and the right plate 196 extend from the inner wall 124 of the front plate 120 a target distance such that the central mount 194 and the central mount 198 are aligned with the left mount 168 and the right mount 178, respectively.

Figure 7C:
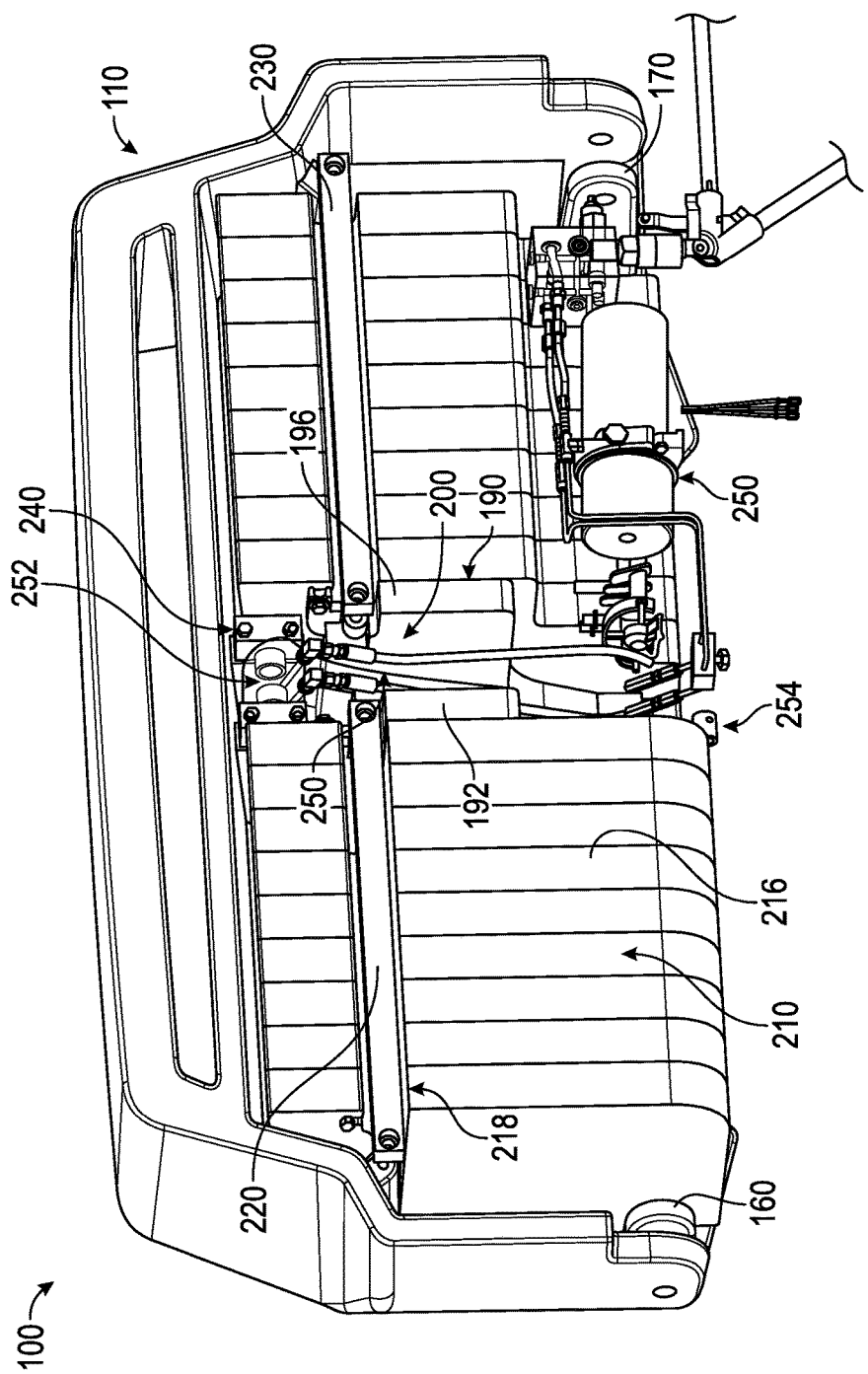
Figure 7D:
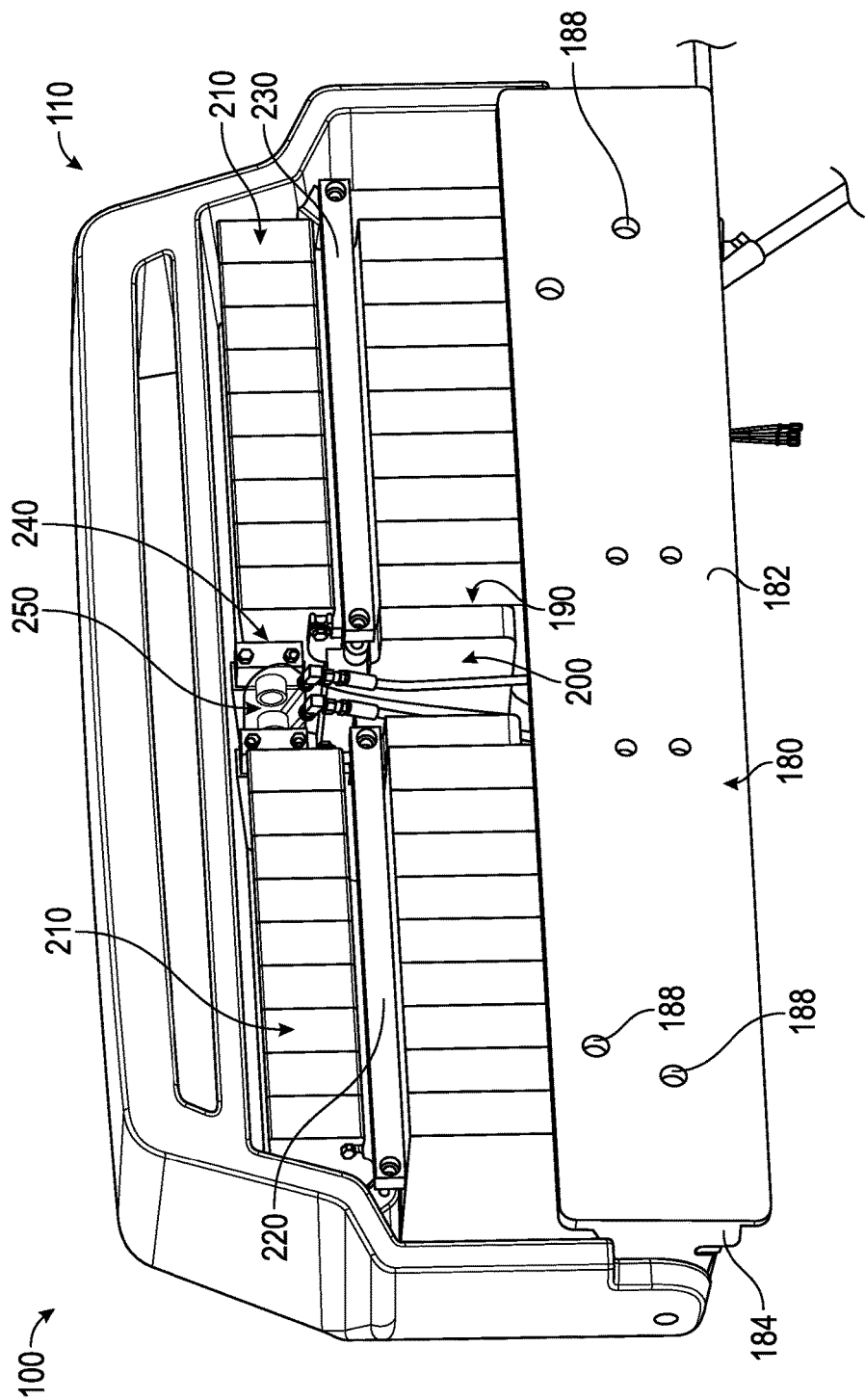
Figure 7E:
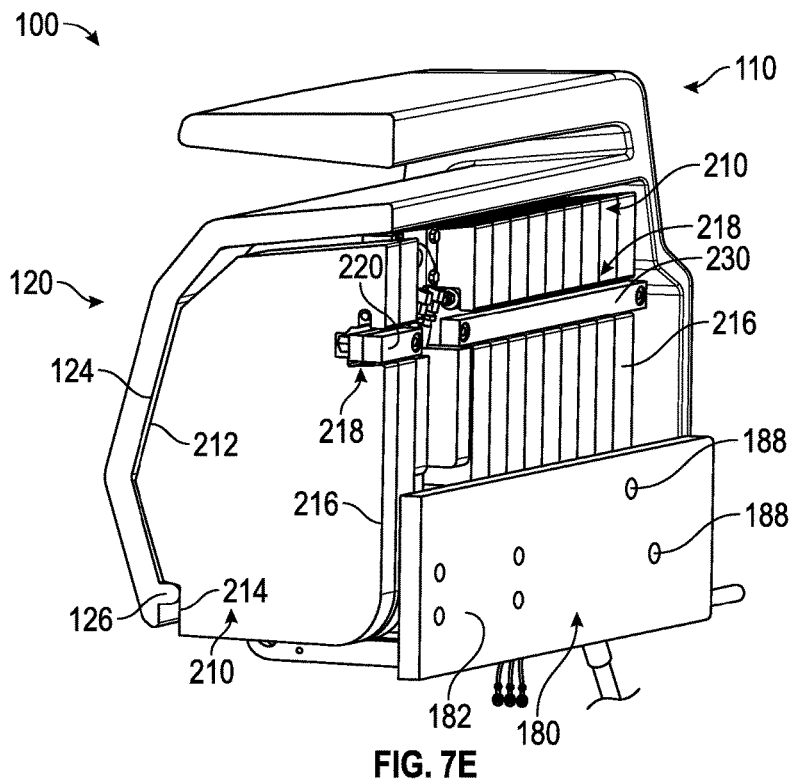

As shown in FIGS. 7B-7E, the cavity 112 of the counterweight housing 110 is configured to receive a plurality of weights, shown as counterweights 210. As shown in FIG. 7E, the counterweights 210 include a first surface, shown as inner surface 212, shaped to correspond with the shape of the inner wall 124 and the retaining lip 126 of the front plate 120, and the inner wall 134 of the top plate 130. As shown in FIG. 7E, the inner surface 212 defines a cutout, shown as notch 214, configured to engage the retaining lip 126 of the front plate 120. At shown in FIGS. 7B-7E, the counterweights 210 include a second surface, shown as outer surface 216. The outer surface 216, defines a cutout, shown as slot 218.

As shown in FIGS. 7B-7E, the slots 218 of the counterweights 210 are configured to receive a first retaining member, shown as retaining bar 220, and/or a second retaining member, shown as retaining bar 230. As shown in FIG. 7B, the retaining bar 220 defines a first aperture, shown as left aperture 224, positioned to correspond with the left mount 168 and a second aperture, shown as right aperture 222, positioned to correspond with the central mount 194 to facilitate fastening the retaining bar 220 to the counterweight housing 110 and the center bracket 190. The retaining bar 230 defines a first aperture, shown as right aperture 234, positioned to correspond with the right mount 178 and a second aperture, shown as left aperture 232, positioned to correspond with the central mount 198 to facilitate fastening the retaining bar 230 to the counterweight housing 110 and the center bracket 190. In an alternative embodiment, a single retaining bar extends across the counterweight housing 110 between the left mount 168 to the right mount 178.

As shown in FIGS. 7B-7E, the counterweights 210 include a first plurality of counterweights 210 positioned between the left bracket 160 and the left plate 192 of the center bracket 190 and a second plurality of counterweights 210 positioned between the right bracket 170 and the right plate 196 of the center bracket 190. According to an exemplary embodiment, the first plurality of counterweights 210 are held (e.g., retained, selectively fixed, etc.) within the counterweight housing 110 at least due to the engagement of the notch 214 with the retaining lip 126 and the slot 218 with the retaining bar 220. According to an exemplary embodiment, the second plurality of counterweights 210 are held (e.g., retained, selectively fixed, etc.) within the counterweight housing 110 at least due to the engagement of the notch 214 with the retaining lip 126 and the slot 218 with the retaining bar 230.

By way of example, the counterweights 210 may be selectively added or removed from the counterweight housing 110 to increase or decrease the total weight of the counterweight system 100. In one embodiment, each counterweight 210 weighs approximately 215 pounds, facilitating adjustment of the overall weight of the counterweight system 100 by increments of 215 pounds. In other embodiments, each counterweight 210 weighs less than or greater than 215 pounds. According to an exemplary embodiment, the counterweight system 100 weighs a total of approximately 1,500 pounds without the counterweights 210 and may be increased to a total of approximately 3,500 pounds by adding the counterweights 210. In other embodiments, the counterweight system 100 weighs less than or greater than a total of 1,500 pounds without the counterweights 210 and may be adjusted to weigh less than or in excess of 3,500 pounds by adding the counterweights 210. According to an exemplary embodiment, selectively adding or removing the counterweights facilitates a user of the counterweight system 100 in modifying front axle laden weight based on the capacity of the front axle 20 (e.g., during a non-towing scenario, etc.), along with modifying the weight content of the counterweight system 100 for heavy pick and tow scenarios.

As shown in FIGS. 7C-7D, the counterweight system 100 includes a first actuator, shown as rotation actuator 250. According to an exemplary embodiment, the rotation actuator 250 is or includes a hydraulic actuator. In other embodiments, the actuator is or includes at least one of an electric actuator, a pneumatic actuator, an electric-hydraulic actuator, and a pulley system. As shown in FIG. 7C, the rotation actuator 250 includes a first end, shown as top end 252, and a second end, shown as bottom end 254. The top end 252 is coupled to the actuator bracket 240, and the bottom end 254 is coupled to the mounting bracket 180, the front bumper 16, and/or the frame 12, according to various embodiments.

As shown in FIGS. 7D-7E, the mounting plate 182 of the mounting bracket 180 defines a plurality of apertures, shown as mounting apertures 188. The mounting apertures 188 are configured to facilitate coupling the mounting bracket 180 to a respective mounting location (e.g., the front bumper 16, etc.) of the truck 10 with fasteners (e.g., bolts, etc.). In other embodiments, the mounting bracket 180 is otherwise coupled to the truck 10 (e.g., welded, integrally formed with the front bumper 16, etc.). According to an exemplary embodiment, at least one of the first plurality of counterweights 210 and the second plurality of counterweights 210 are shaped (e.g., include a cutout, etc.) to facilitate fitting some of the components of the rotation actuator 250 (e.g., hydraulic pump, fluid/air conduits, air compressor, motor, etc.) within the cavity 112 of the counterweight housing 110 between the counterweights 210 and the mounting plate 182.

According to an exemplary embodiment, the counterweight housing 110 (e.g., including the counterweights 210, etc.) rotates away from the mounting bracket 180 when the rotation actuator 250 is activated in a first direction (e.g., extended, retracted, etc.) and rotates towards the mounting bracket 180 when the rotation actuator 250 is activated in an opposing second direction (e.g., retracted, extended, etc.). In one embodiment, the counterweight housing 110 is rotatable between zero and ninety degrees (e.g., away from the mounting bracket 180, relative to the base position 102, etc.). In some embodiments, the counterweight system 100 includes a manual, hand-operated actuator (e.g., a hand pump, a hand crank, etc.) to facilitate manual actuation and/or manual override of the counterweight housing 110 rotation.

Figure 8A:
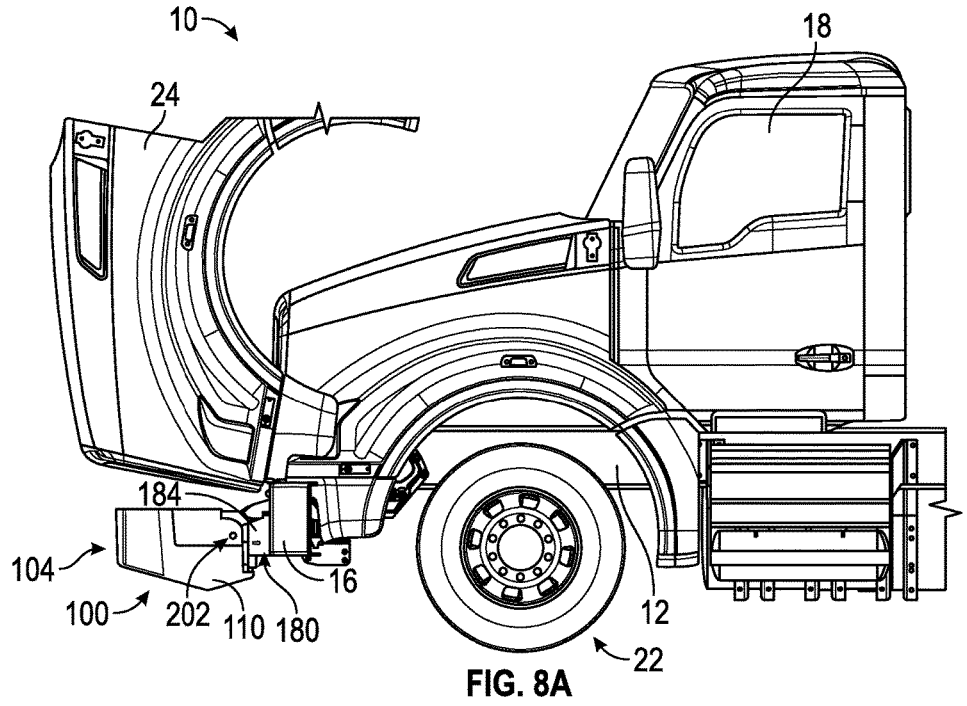
Figure 8B:
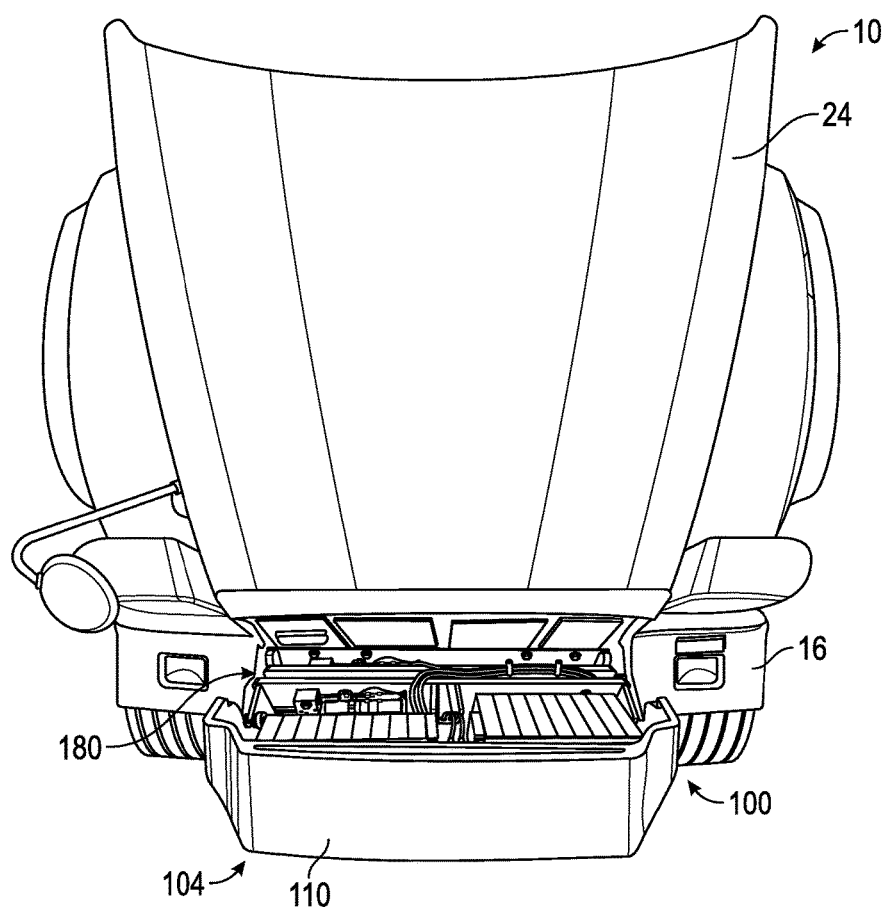
Figure 9A:
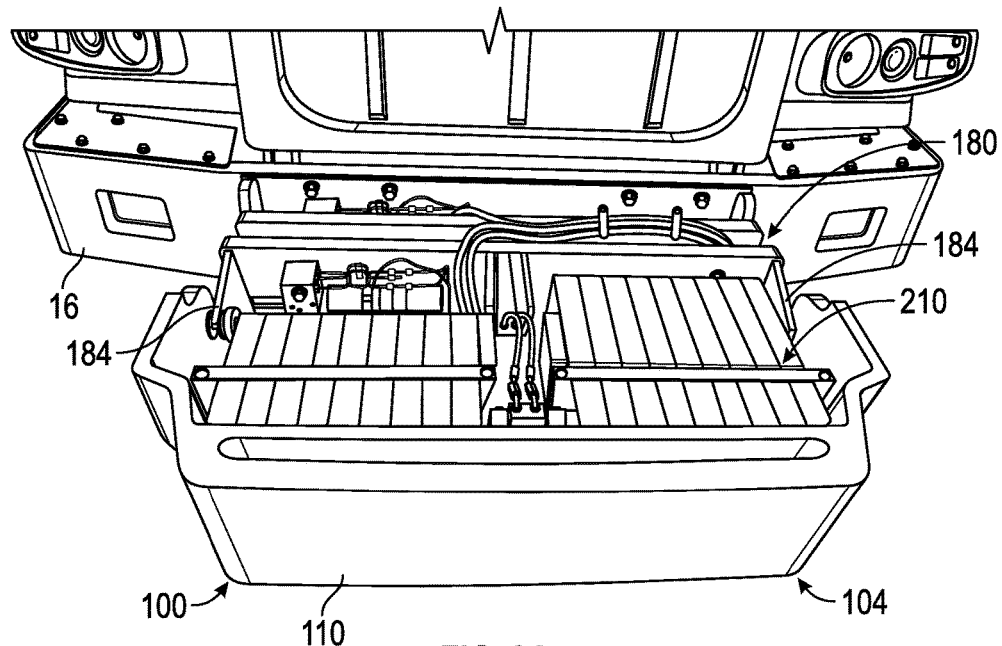
FIGS. 9A-9C are various views of a vehicle including a modular counterweight system in a second position, according to another exemplary embodiment.
Figure 9B:
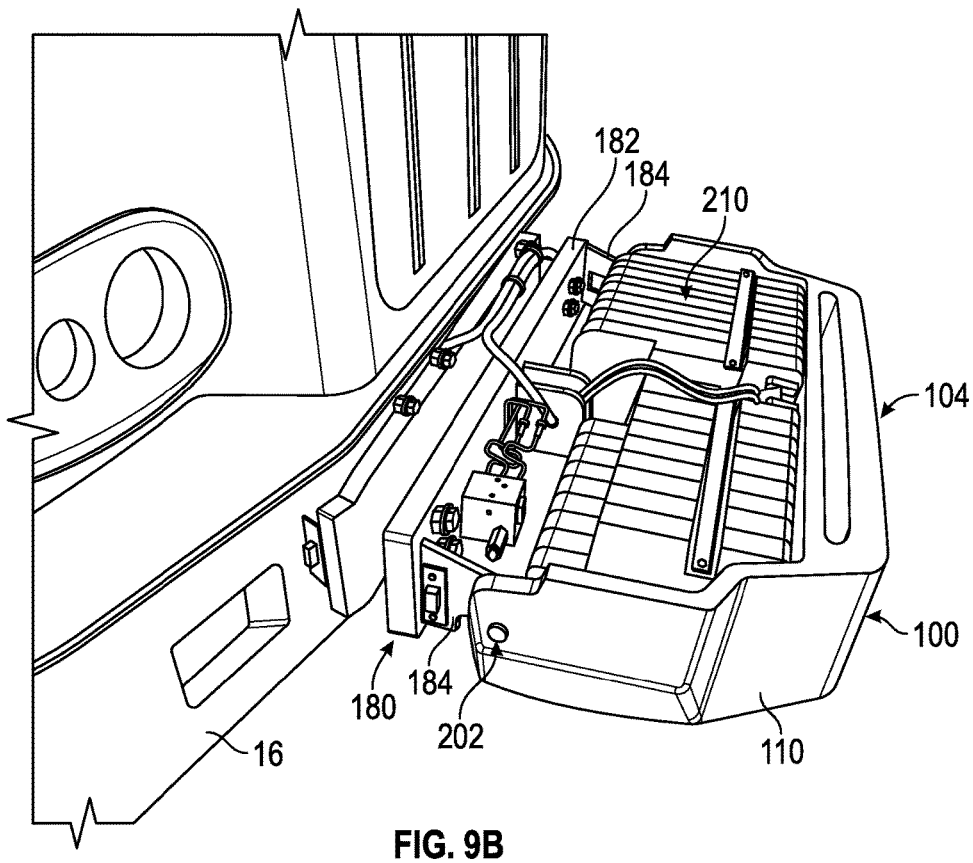
Figure 9C:
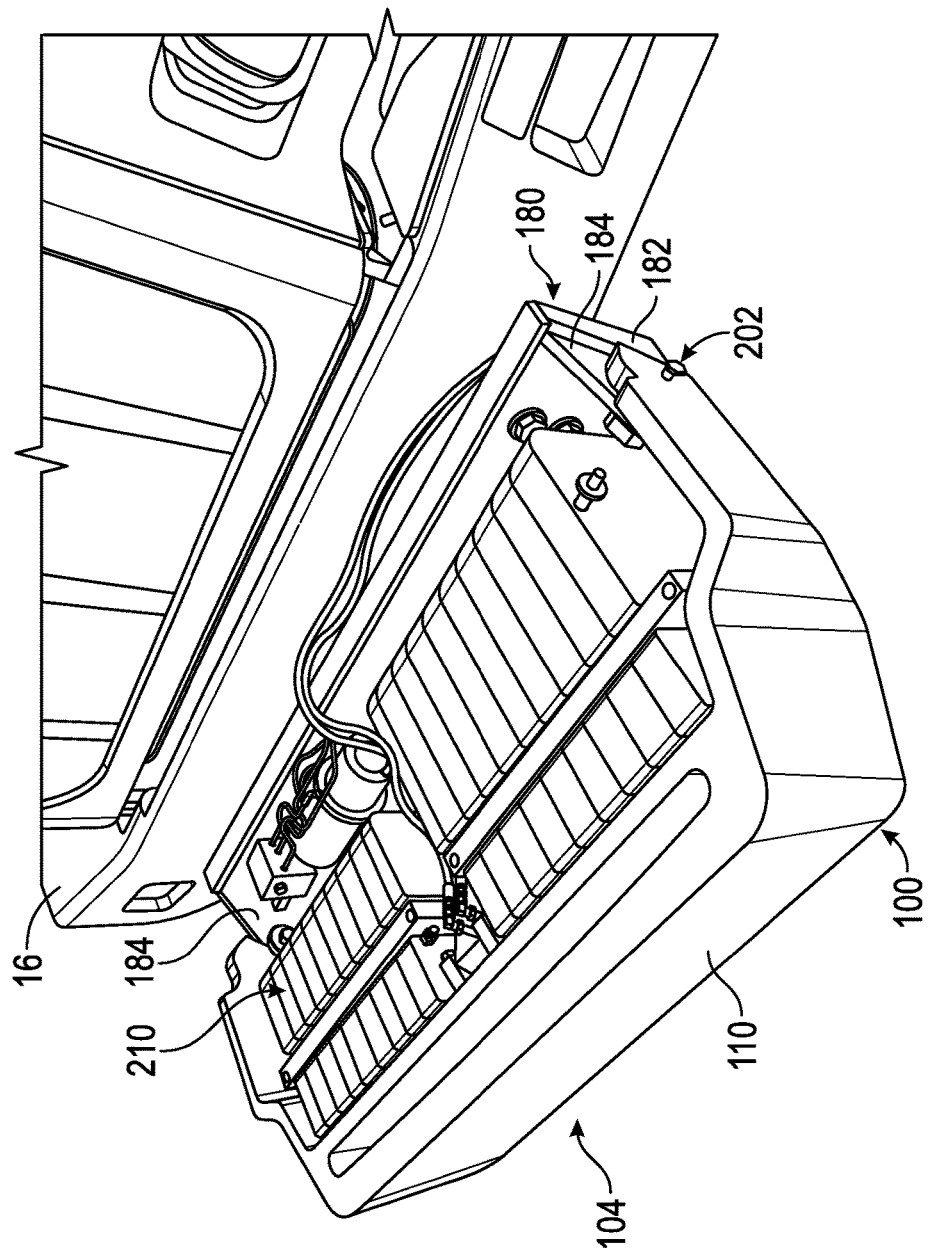

According to the exemplary embodiment shown in FIGS. 8A-9C, the counterweight housing 110 of the counterweight system 100 is selectively pivotable (e.g., by the rotation actuator 250, etc.). The counterweight housing 110 is capable of pivoting about the coupling pins 202 from the base position 102 through a range of motion to a second position, shown as fully-rotated position 104. According to an exemplary embodiment, the fully-rotated position 104 is angularly offset approximately ninety degrees relative to the base position 102 (e.g., between eighty and one hundred and ten degrees, etc.). According to an exemplary embodiment, the pivoting feature of the counterweight system 100 improves serviceability without adversely impacting the ground clearance of the truck 10 (e.g., as may occur by positioning a counterweight lower, etc.). As shown in FIGS. 8A-8C, the counterweight housing 110 is selectively repositionable into the fully-rotated position 104 such that the hood 24 may be opened without interference from the counterweight system 100. Traditionally, a front mounted counterweight may be mounted lower such that it does not interfere with the pivoted hood 24, decreasing the ground clearance of the truck 10. The counterweight system 100 pivots to maintain the serviceability and the ground clearance of the truck 10.

According to an exemplary embodiment, selectively pivoting the counterweight housing 110 with the rotation actuator 250 between the base position 102 and the fully-rotated position 104 facilitates selectively adjusting the center of gravity of the truck 10 to a target center of gravity. The counterweight housing 110 may be rotated to increase the effective weight provided to the front axle 20 of the truck 10 and/or reposition the center of gravity of the truck 10 by selectively adjusting the center of gravity of the counterweight system 100 to a target location. By way of example, the counterweight housing 110 may be selectively pivoted during high load conditions (e.g., heavy pick and tow scenarios, etc.) where the tires of the front axle 20 of the truck 10 may otherwise experience reduced ground-bearing pressure, adversely affecting steering and traction of the truck 10. Selectively pivoting the counterweight housing 110 with the rotation actuator 250 may thereby increase the maneuverability of the truck 10.

Figure 10:
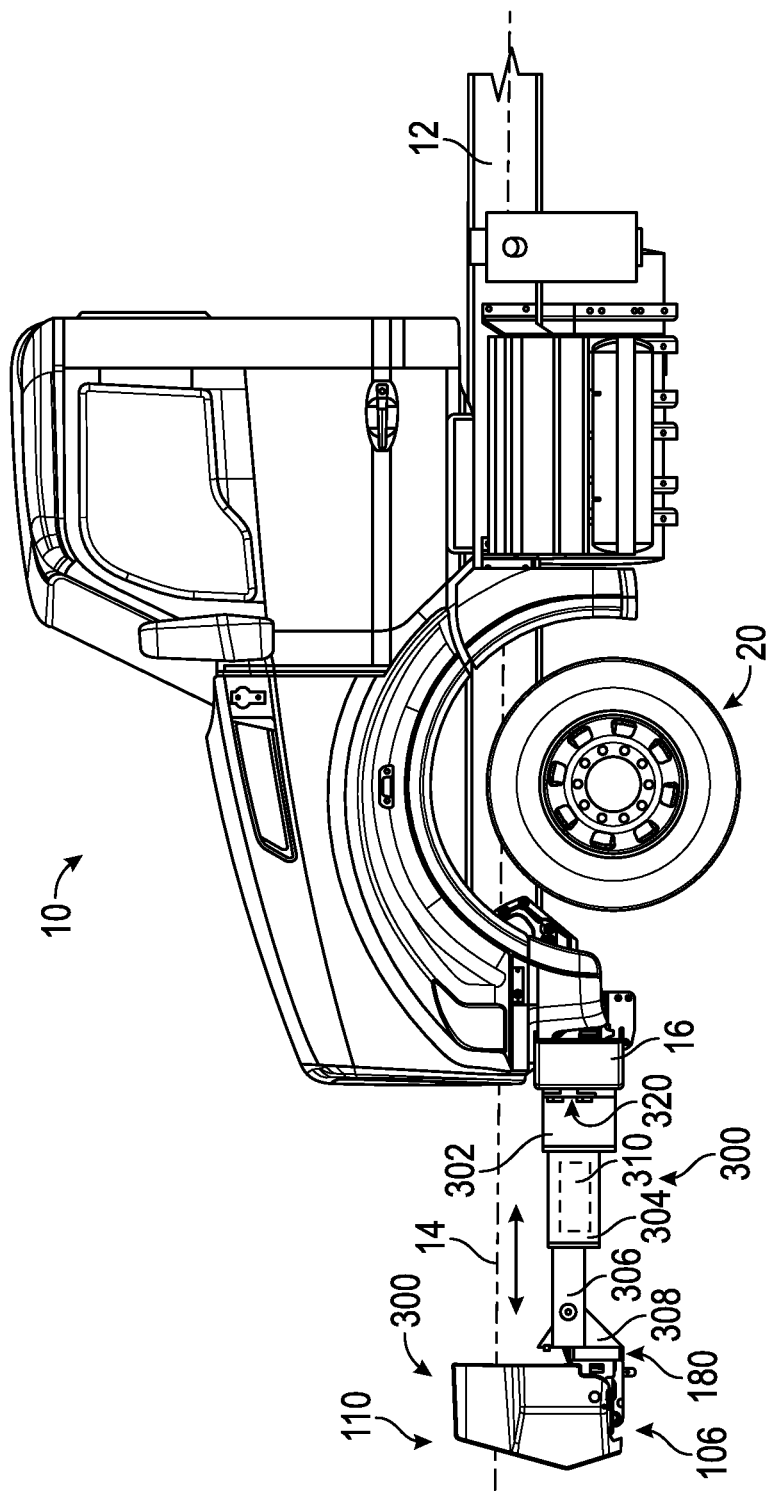
FIG. 10 is a side view of a vehicle including a modular counterweight system in a third position, according to exemplary embodiment.
Figure 11A:
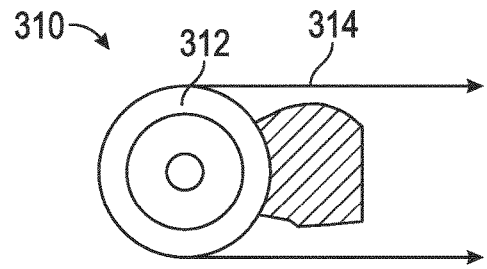
FIGS. 11A-11B are various schematic diagrams of actuators of a modular counterweight system, according to various exemplary embodiments.
Figure 11B:
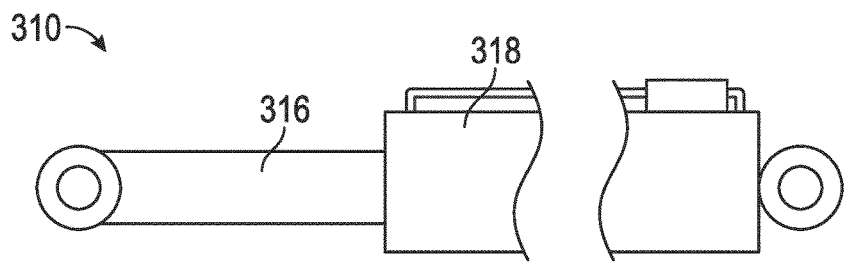

According to the exemplary embodiment, shown in FIGS. 10-11B, the counterweight system 100 is selectively extendable along the longitudinal axis 14 away from the truck 10 from the base position 102 through a range of motion to a third position, shown as fully-extended position 106. The counterweight system 100 may include a lock configured to selectively hold the counterweight housing 110 in a fixed position (e.g., at one or more points between the first position and the second position, at one or more points between the first position and the third position, at one or more points between the second position and the third position, etc.). As shown in FIG. 10, the counterweight system 100 is coupled to an extension mechanism, shown as extension mechanism 300. According to the exemplary embodiment shown in FIG. 10, the extension mechanism 300 includes a plurality of telescoping boom sections, shown as first boom section 302, second boom section 304, and third boom section 306, a first bracket, shown as mounting bracket 320, and a second bracket, shown as coupling bracket 308. As shown in FIG. 10, the mounting bracket 180 of the counterweight system 100 is configured to engage the coupling bracket 308 of the extension mechanism 300, and the mounting bracket 320 of the extension mechanism 300 is configured to couple the extension mechanism 300 and the counterweight system 100 to the truck 10 (e.g., the frame 12, the front bumper 16, etc.).

In some embodiments, the extension mechanism 300 includes a different number of boom sections (e.g., two, four, etc.). In an alternative embodiment, the extension mechanism 300 includes a plurality of scissor arms that are configured to facilitate extending and retracting the counterweight system 100. As shown in FIG. 10, the extension mechanism 300 includes a second actuator, shown as extension actuator 310. The extension actuator 310 is positioned to extend and retract the plurality of boom sections (and/or scissor arms) to facilitate selectively translating the counterweight system 100 along the longitudinal axis 14. As shown in FIG. 11A, the extension actuator 310 includes a pulley-cable or sprocket-chain system having at least one pulley and/or sprocket 312 and at least one cable and/or chain 314. As shown in FIG. 11B, the extension actuator 310 includes a rod and cylinder system having a rod 316 and a cylinder 318 (e.g., a hydraulic cylinder, a pneumatic cylinder, an electrohydraulic cylinder, etc.).

According to an exemplary embodiment, the extension feature of the counterweight system 100 maintains ease of serviceability without adversely impacting the ground clearance of the truck 10 (e.g., the hood 24 is able to be opened without interference from the counterweight system 100, similar to the pivoting feature, etc.). According to an exemplary embodiment, selectively extending the counterweight system 100 with the extension mechanism 300 between the base position 102 and the fully-extended position 106 facilitates selectively adjusting the center of gravity of the truck 10 to the target center of gravity. The counterweight system 100 may be extended to increase the effective weight provided to the front axle 20 of the truck 10 by selectively adjusting the center of gravity of the truck 10 to a target center of gravity. Selectively extending the counterweight system 100 with the extension actuator 310 may thereby increase the maneuverability of the truck 10. In some embodiments, the counterweight system 100 is configured to be at least one of selectively pivotable and selectively extendable.

In some embodiments, the counterweight system 100 and/or the truck 10 additionally or alternatively includes a translation mechanism having a third actuator (e.g., translation actuator, etc.) configured to translate the counterweight system 100 laterally along the truck 10 and/or the front bumper 16. The counterweight system 100 may be translated laterally where the truck 10 is experiencing high loading on a lateral side of the truck 10 (e.g., pulling a vehicle out of a ditch from an angle, etc.). By translating the counterweight system 100 laterally (e.g., opposite the load, etc.), the center of gravity of the truck 10 is offset to counteract the moment and/or force created by the side load. In some embodiments, the counterweight system 100 is at least one of pivoted, translated, and extended.

According to an exemplary embodiment, the counterweight system 100 reduces the overall weight of the truck 10. Selectively repositioning (e.g., pivoting, translating, extending, etc.) the counterweight system 100 increases an effective weight of the truck 10 (e.g., by moving the center of gravity, creating a moment arm with the counterweight system 100, etc.), thereby facilitating reducing the actual weight of the truck 10. A truck 10 with the counterweight system 100 installed may be lighter relative to traditional vehicles by reducing the weight (e.g., of the body assembly 30, etc.) of the truck 10 and/or by eliminating body counterweight systems. Reducing the weight of the truck 10 allows for increased storage space within the storage compartments 32, lower cost of manufacture and purchase, increased fuel efficiency, increased maneuverability, and/or satisfying various regulatory weight requirements, while maintaining or improving towing capacity of the truck 10.

Figure 12:
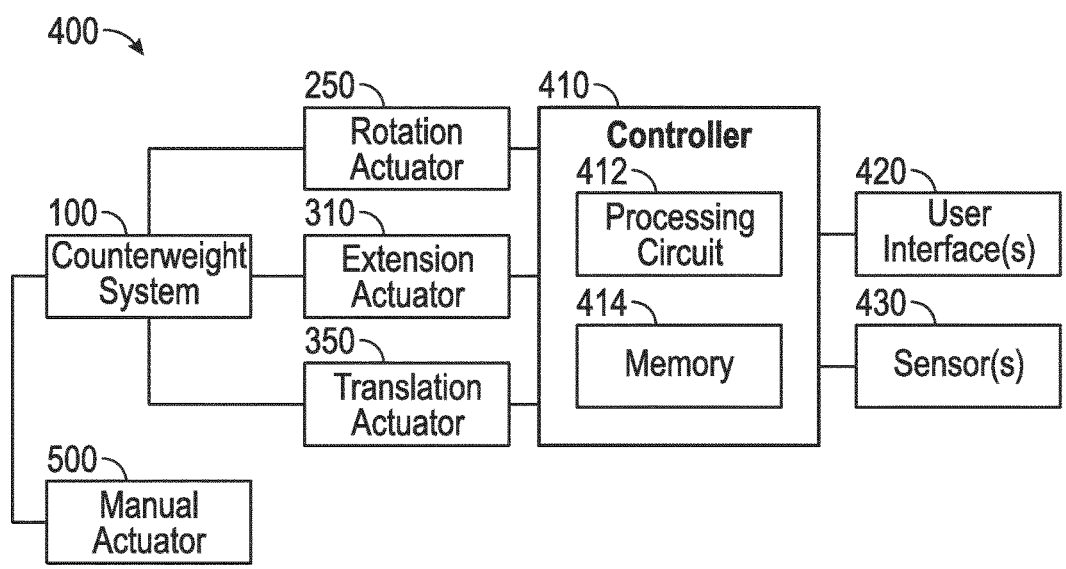
FIG. 12 is a block diagram of a controller used to operate and/or control various components of a vehicle, according to an exemplary embodiment.

According to the exemplary embodiment shown in FIG. 12, a control system 400 for a vehicle (e.g., the truck 10, etc.) includes a controller 410. In one embodiment, the controller 410 is configured to selectively engage, selectively disengage, control, or otherwise communicate with components of the truck 10 according to various modes of operation. As shown in FIG. 12, the controller 410 is coupled to the rotation actuator 250, the extension actuator 310, a third actuator, shown as translation actuator 350, a user interface 420, and one or more sensors 430. The controller 410 may be configured to selectively control the position (e.g., rotation, translation, extension, etc.) of the counterweight system 100. By way of example, the controller 410 may send and receive signals with the rotation actuator 250, the extension actuator 310, the translation actuator 350, the user interface 420, and the one or more sensors 430.

The controller 410 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 12, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412. The memory 414 includes various actuation profiles corresponding to loading conditions and/or hood position experienced by the truck 10, according to an exemplary embodiment. In some embodiments, controller 410 may represent a collection of processing devices (e.g., servers, data centers, etc.). In such cases, the processing circuit 412 represents the collective processors of the devices, and the memory 414 represents the collective storage devices of the devices.

In one embodiment, the user interface 420 includes a display and an operator input. The display may be configured to display a graphical user interface, an image, an icon, or still other information. In one embodiment, the display includes a graphical user interface configured to provide general information about the truck 10 (e.g., truck 10 speed, fuel level, warning lights, etc.). The graphical user interface may also be configured to display a current position of the counterweight system 100, recommended positions for the counterweight system 100, instructions to add or remove counterweights 210, and/or still other information relating to the truck 10 and/or the counterweight system 100.

The operator input may be used by an operator to provide commands to at least one of the rotation actuator 250, the extension actuator 310, and the translation actuator 350. The operator input may include one or more buttons, knobs, touchscreens, switches, levers, joysticks, pedals, or handles. The operator may be able to manually control some or all aspects of the operation of the counterweight system 100 and the truck 10 using the display and the operator input. It should be understood that any type of display or input controls may be implemented with the systems and methods described herein. In some embodiments, the operator may control at least one of extension, translation, and rotation of the counterweight system 100 with a manual actuator, shown as manual actuator 500.

In some embodiments, the controller 410 is configured to at least one of extend and pivot the counterweight system 100 in response to the one or more sensors 430 acquiring data indicating that the hood 24 of the truck 10 is being opened. In some embodiments, the controller 410 is configured to at least one of extend, translate, and pivot the counterweight system 100 in response to the one or more sensors 430 acquiring data indicating that a high loading condition is occurring and/or the tires of the front axle 20 are losing ground bearing pressure with a ground surface. The controller 410 may be configured to selectively reposition the counterweight system 100 to achieve a target center of gravity to increase the performance of the truck 10 (e.g., maneuverability, towing and/or picking capacity, traction, etc.).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the modular counterweight system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A modular counterweight system for a vehicle, comprising:

a housing configured to selectively interface with a plurality of counterweights, facilitating incremental adjustment of an overall weight of the modular counterweight system;

a bracket configured to couple the housing to the vehicle, wherein the housing is at least one of (i) pivotally coupled to the bracket, (ii) extensionally coupled to the bracket, and (iii) translationally coupled to the bracket, the bracket including:

a plate configured to couple the modular counterweight system to the vehicle; and a plurality of arms extending from the plate and configured to couple the housing to the plate; and an actuator positioned to selectively reconfigure at least one of the housing and the bracket and thereby change the center of gravity of the modular counterweight system.

2. The modular counterweight system of claim 1, wherein the housing includes a plurality of interfaces positioned to receive the plurality of arms of the bracket.

3. The modular counterweight system of claim 2, further comprising a plurality of pins positioned to engage with the plurality of interfaces of the housing and the plurality of arms of the bracket, pivotally coupling the housing to the bracket.

4. The modular counterweight system of claim 2, wherein the plurality of arms of the bracket are coupled to the plurality of interfaces of the housing in a fixed arrangement, preventing relative movement therebetween.

5. The modular counterweight system of claim 1, further comprising an extension mechanism configured to:

(a) at least one of couple the housing to the bracket and couple the bracket to the vehicle; and (b) facilitate extending and retracting the housing between a retracted position and an extended position.

6. A modular counterweight system for a vehicle, comprising:

a housing configured to selectively interface with a plurality of counterweights, facilitating incremental adjustment of an overall weight of the modular counterweight system, wherein the housing defines an internal cavity configured to selectively receive the plurality of counterweights;

a bracket configured to couple the housing to the vehicle, wherein the housing is at least one of (i) pivotally coupled to the bracket, (ii) extensionally coupled to the bracket, and (iii) translationally coupled to the bracket; and an actuator positioned to selectively reconfigure at least one of the housing and the bracket and thereby change the center of gravity of the modular counterweight system.

7. The modular counterweight system of claim 6, wherein the housing defines a first mount and a second mount.

8. The modular counterweight system of claim 7, further comprising a retaining member coupled to and extending between the first mount and the second mount, wherein the retaining member holds the plurality of counterweights within the internal cavity of the housing.

9. A vehicle, comprising:

a chassis defining a longitudinal axis;

a body coupled to the chassis;

a hood; and a modular counterweight system coupled to at least one of the chassis and the body, the modular counterweight system including a plurality of counterweights, facilitating incremental adjustment of an overall weight of the modular counterweight system;

wherein the modular counterweight system is selectively pivotable relative to the at least one of the body and the chassis between a first position and a second position to provide a target center of gravity for the vehicle;

wherein the modular counterweight system is positioned at a front end of the at least one of the chassis and the body and obstructs opening of the hood when in the first position and facilitates opening of the hood when in the second position.

10. The vehicle of claim 9, wherein the modular counterweight system includes an actuator positioned to facilitate selectively pivoting the modular counterweight system between the first positioned and the second position.

11. The vehicle of claim 9, wherein the second position is angularly offset approximately ninety degrees relative to the first position.

12. The vehicle of claim 9, wherein the body includes a front bumper coupled to the front end of the chassis, wherein the modular counterweight system is coupled to the front bumper.

13. A vehicle, comprising:

a chassis defining a longitudinal axis;

a body coupled to the chassis;

a modular counterweight system including a plurality of counterweights, facilitating incremental adjustment of an overall weight of the modular counterweight system, wherein the modular counterweight system is selectively repositionable relative to the at least one of the body and the chassis between a first position and a second position to provide a target center of gravity for the vehicle; and an extension mechanism coupling the modular counterweight system to the at least one of the chassis and the body, the extension mechanism configured to facilitate extending and retracting the modular counterweight system between the first position and the second position such that the modular counterweight system is selectively extendable along the longitudinal axis between the first position and the second position, wherein the first position is proximate the vehicle and the second position is spaced from the vehicle.

14. The vehicle of claim 13, wherein the extension mechanism includes at least one of a plurality of telescoping boom sections and a plurality of scissor arms.

15. The vehicle of claim 14, wherein the extension mechanism includes at least one of (a) a pulley-cable system, (b) a sprocket-chain system, and (c) a rod and cylinder system positioned to facilitate the extension and the retraction of the modular counterweight system.

16. A modular counterweight system for a vehicle, comprising:

a housing defining a cavity;

a plurality of counterweights selectively received within the cavity, facilitating incremental adjustment of an overall weight of the modular counterweight system;

a bracket configured to couple the housing to at least one of a front end and a rear end of the vehicle; and an actuator positioned to facilitate selectively repositioning at least one of (i) the housing and the plurality of counterweights and (ii) the bracket from a base position to at least one of a rotated position and an extended position to provide a target center of gravity for the vehicle.

* * * * *